United States Patent [19]

Howard, Jr.

[11] Patent Number: 5,355,088

[45] Date of Patent: Oct. 11, 1994

[54] METHOD AND APPARATUS FOR DETERMINING PARAMETERS OF A TRANSITION ZONE OF A FORMATION TRAVERSED BY A WELLBORE AND GENERATING A MORE ACCURATE OUTPUT RECORD MEDIUM

[75] Inventor: Allen Q. Howard, Jr., Kingwood, Tex.

[73] Assignee: Schlumberger Technology Corporation, Houston, Tex.

[21] Appl. No.: 686,099

[22] Filed: Apr. 16, 1991

[51] Int. Cl.$^5$ ............................................. G01V 3/18
[52] U.S. Cl. .................................. 324/339; 364/422
[58] Field of Search ............... 324/323, 338, 339, 366; 364/422

[56] References Cited

U.S. PATENT DOCUMENTS

| | | | |
|---|---|---|---|
| 3,134,941 | 5/1964 | Norelius | 324/366 |
| 4,107,597 | 8/1978 | Meador et al. | |
| 4,273,941 | 7/1981 | Freedman | |
| 4,338,664 | 7/1982 | Mayer | 364/422 |
| 4,703,277 | 10/1987 | Kenyon et al. | 324/323 |
| 4,937,747 | 6/1990 | Koller | 324/323 |
| 5,041,975 | 8/1991 | Minerbo et al. | |
| 5,126,939 | 6/1992 | Carpentier et al. | 324/339 X |
| 5,148,110 | 9/1992 | Holms | 324/323 |

OTHER PUBLICATIONS

"Proceedings of the 6th Annual Technical Conference of Society of Petroleum Engineers", Sep. 23–26, 1990. See Invasion Interpretation on p. 299 (p. 5 of the article).
"Response of Electromagnetic Pulse Logging Sonde in Axially Symmetrical Formation", Mar. 1991.
Hunka, J. F., et al., "A New Resistivity Measurement System for Deep Formation Imaging and High Resolution Formation Evaluation," proceedings of the 6th Annual Technical Conference of the Society of Petroleum Engineers, New Orleans, La., pp. 295–307, Sep. 1990.
Wait, J. R., "General Formulation of the Induction Logging Problem for Concentric Layers About the Borehole," Special Issue on Electromagnetic Methods In Applied Geophysics, IEEE Transaction on Geoscience and Remote Sensing, vol. GE-22, No. 1, pp. 34–42, Jan. 1984.
Oppenheim, A. V., and R. W. Schafer, "Digital Signal Processing," Prentice-Hall, Inc., Englewood Cliffs, New Jersey, pp. 219–220, (no month) 1975.
Twomey, S., "Introduction to the Mathematics of Inversion in Remote Sensing and Indirect Measurements," Scientific Publishing Company, Amsterdam, Chapter 6, (no month) 1977.
Howard, A. Q., Jr., C. E. Glass, D. B. henry, D. M. N'Guessan and D. M. Siemers, "Wave Diffusion Geotomography," Report to the U.S. Nuclear Regulatory Commission, NUREG/CR-3143, vol. 4, Department of Mining and Geological Engineering, University of Arizona, Tucson, Ariz., 113 pp; Oct. 1983.
Chew, W. C., S. Barone, B. Anderson and C. Hennessy, "Diffraction of Axisymmetric Waves in a Borehole by Bed Boundary Discontinuities," Geophysics vol. 49, pp. 1586–1595, Oct. 1984.
Log Interpretation Principles/Applications, 2nd Edition, Schlumberger Educational Services, 1331 Lamar Suite 1175, Houston, Tex. 77010, pp. 89–90, Oct. 1987.

*Primary Examiner*—Walter E. Snow
*Attorney, Agent, or Firm*—Henry N. Garrana; John H. Bouchard

[57] ABSTRACT

A system receives output signals from a well tool disposed in a wellbore and generates a set of invasion parameters associated with a transition zone of a formation traversed by the wellbore, the parameters being used to plot a more accurate resistivity log on an output record medium. The invasion parameters include Rxo, the flushed zone resistivity; Rt, the uninvaded zone resistivity; and two other parameters not previously known, the "w" parameter and the "N" parameter, where "w" represents the midpoint of the transition zone region on the resistivity log and "N" represents a value related to the slope of the resistivity log in the transition zone region. Given the four parameters, Rxo, Rt, w, and N, a more accurate and improved resistivity log is illustrated on an output record medium, one which reflects a gradual, and not an abrupt, change in the resistivity in the transition zone portion of the log.

24 Claims, 21 Drawing Sheets

FIG. 3
(PRIOR ART)
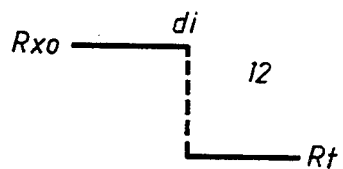
FIG. 4
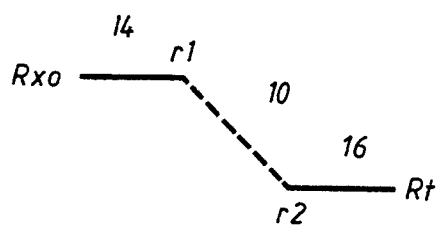
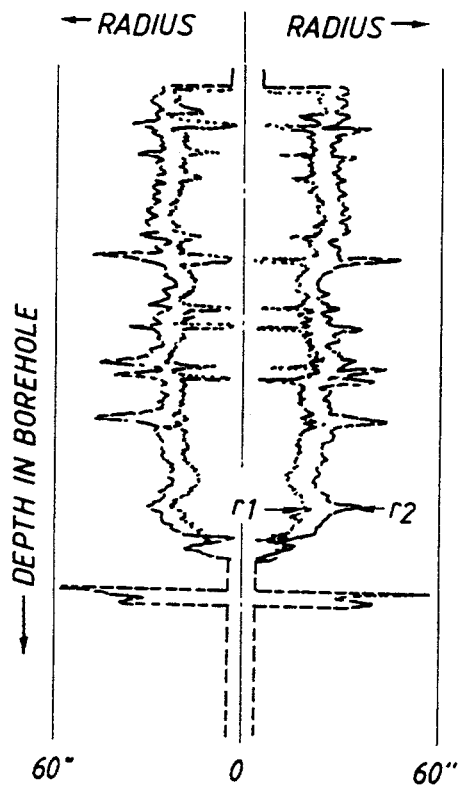
FIG. 5a
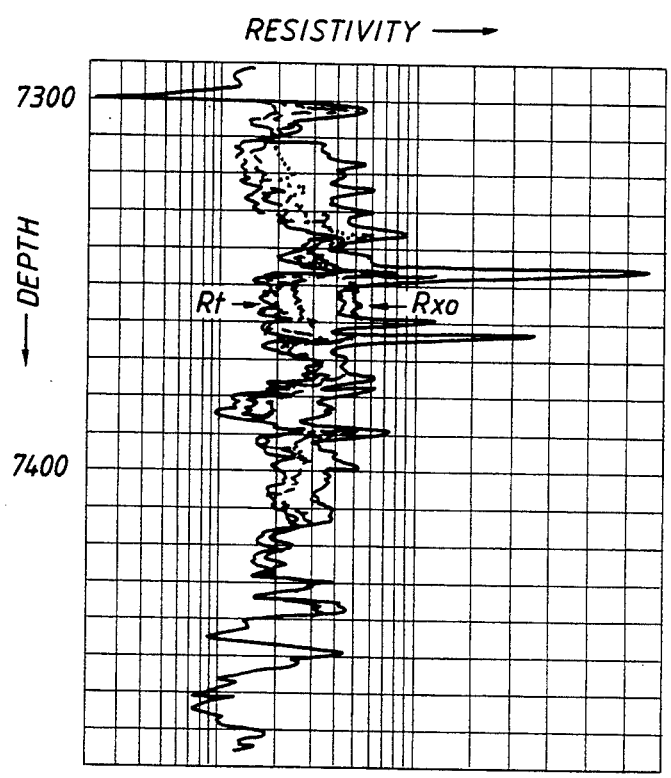
FIG. 5b

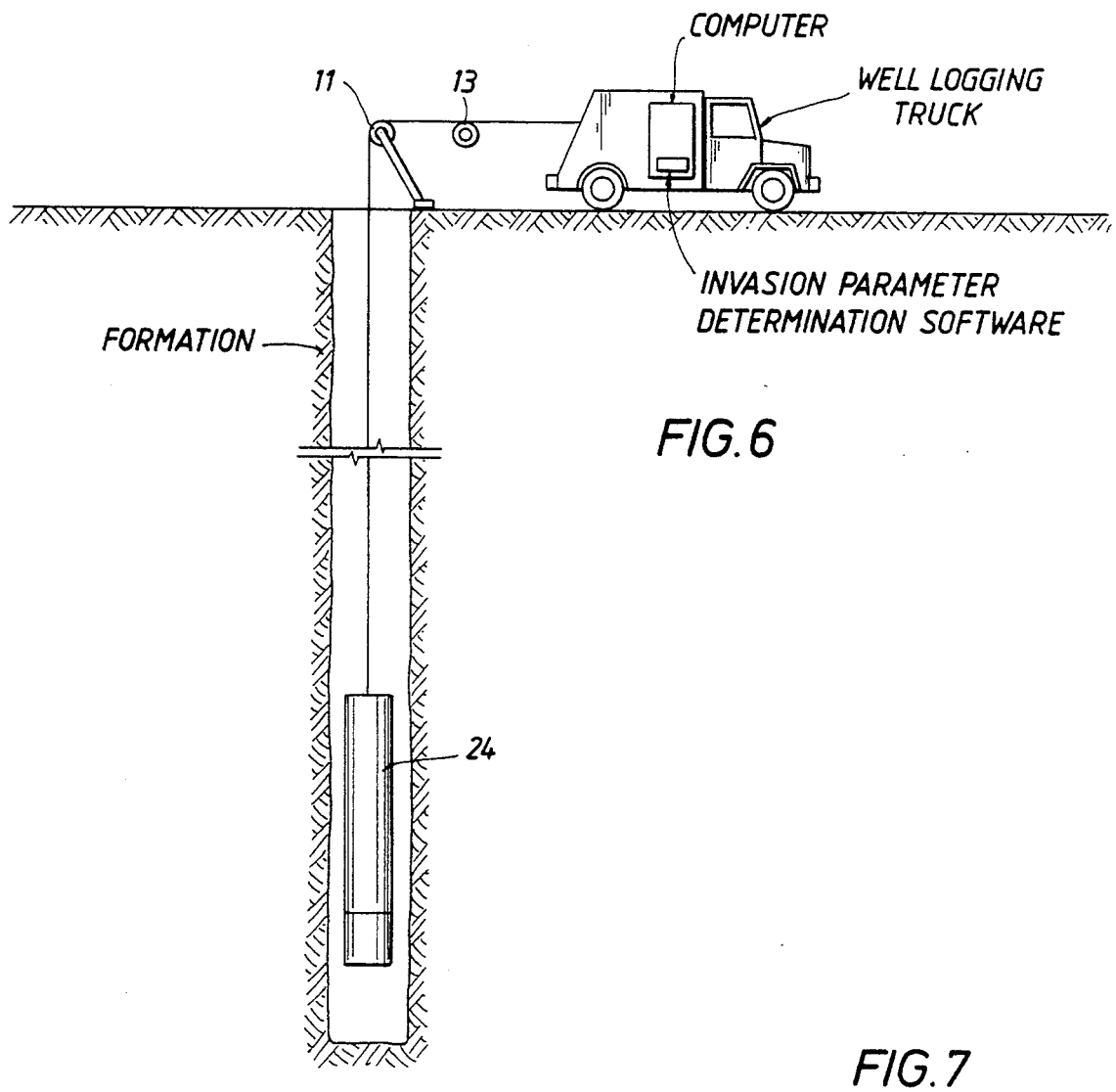
FIG.6
FIG.7
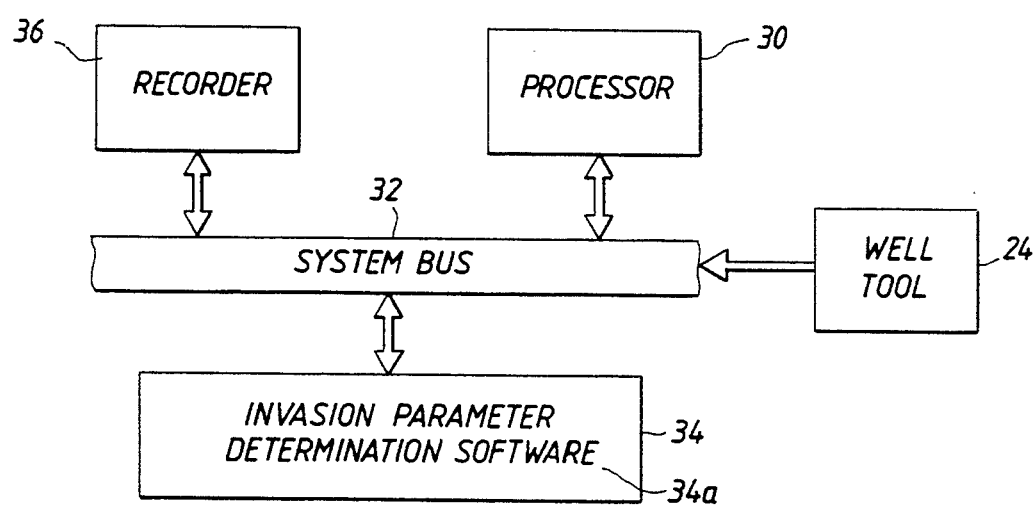

|  | EXACT | ESTIMATE |
|---|---|---|
| r1 (INCHES) | 4.0 | 15.8 |
| r2 (INCHES) | 64.0 | 53.9 |
| σt (mS/m) | 50.0 | 44.7 |
| σxo (mS/m) | 500.0 | 573.0 |

| | EXACT, BED1 | TYP. ESTI-MATE | EXAXT, BED2 | CENTER ESTI-MATE | EXACT, BED 3 | TYP. ESTI-MATE |
|---|---|---|---|---|---|---|
| r₁ (INCHES) | 12.0 | 9.1 | 20.0 | 8.4 | 0.0 | 0.0 |
| r₂ (INCHES) | 12.0 | 13.3 | 20.0 | 16.7 | 0.0 | 0.0 |
| σ_f (mS/m) | 500.0 | 499.3 | 100.0 | 105.0 | 1000.0 | 1001.0 |
| σ (mS/m) | 1000.0 | 1077.6 | 200.0 | 222.0 | 1000.0 | 999.0 |

METHOD AND APPARATUS FOR DETERMINING PARAMETERS OF A TRANSITION ZONE OF A FORMATION TRAVERSED BY A WELLBORE AND GENERATING A MORE ACCURATE OUTPUT RECORD MEDIUM

BACKGROUND OF THE INVENTION

The subject matter of the present invention relates to wellbore apparatus, and more particularly, to a method and apparatus for determining invasion parameters for ultimate use in formation evaluation and in generating a resistivity log output record medium.

During the drilling of a wellbore, mud pumps introduce mud into the well in order to flush rock chips and other unwanted debris out of the wellbore. The mud is introduced into the wellbore under pressure, the mud pressure being slightly greater than the pressure of a formation traversed by the wellbore thereby preventing a phenomenon known as well blowout. The resultant pressure differential between the mud column pressure and the formation pressure forces mud filtrate into the permeable formation, and solid particles of the mud are deposited on the wellbore wall forming a mudcake. The mudcake usually has a very low permeability and, once developed, considerably reduces the rate of further mud filtrate invasion into the wellbore wall. In a region very close to the wellbore wall, most of the original formation water and some of the hydrocarbons may be flushed away by the mud filtrate. This region is known as the "flushed zone", or the "invaded zone". If the flushing is complete, the flushed zone pore space contains only mud filtrate; in addition, if the flushed zone was originally hydrocarbon bearing, it would contain only residual hydrocarbons. Further out from the wellbore wall, the displacement of the formation fluids by the mud filtrate is less and less complete thereby resulting in a second region, this second region undergoing a transition from mud filtrate saturation to original formation water saturation. The second region is known as the "transition zone". The extent or depth of the flushed and transition zones depends on many parameters, among them being the type and characteristics of the drilling mud, the formation porosity, the formation permeability, the pressure differential, and the time since the formation was first drilled. Generally, the lower the formation porosity, the deeper the invasion. The undisturbed formation beyond the transition zone is known as the "uninvaded, virgin, or uncontaminated zone". In FIGS. 1a-1b, a schematic representation of an invasion and resistivity profile in a water-bearing zone is illustrated. FIG. 1a illustrates a cross section of a wellbore showing the locations of the flushed zone, the transition zone, and the uninvaded zone extending radially from the wellbore wall. FIG. 1b illustrates a radial distribution of formation resistivity extending radially from the wellbore wall, into the flushed zone, into the transition zone, and into the uninvaded zone. In FIGS. 2a-2b, a schematic representation of an invasion and resistivity profile in an oil-bearing zone is illustrated. FIG. 2a illustrates the radial distribution of fluids in the vicinity of the wellbore, oil bearing bed. FIG. 2b illustrates the radial distribution of resistivities for an oil bearing zone, similar to the radial distribution of resistivities for a water bearing zone shown in FIG. 1b. Sometimes, in oil and gas bearing formations, where the mobility of the hydrocarbons is greater than that of the water, because of relative permeability differences, the oil or gas moves away faster than the interstitial water. In this case, there may be formed, between the flushed zone and the uninvaded zone, an "annular zone or annulus", shown in FIG. 2b, with a high formation water saturation. Annuli probably occur, to some degree, in most hydrocarbon bearing formations; and their influence on log measurements depends on the radial location of the annulus and its severity. However, the existance of these zones (the flushed, transition, annular, and uninvaded zones) influence resistivity log measurements and therefore the accuracy of the resistivity log itself that is presented to a client. The resistivity log is utilized by the client to determine if oil exists in the formation traversed by the wellbore. The client is mainly interested in the true and correct value of Rt, the resistivity (reciprocal of conductivity) of the uninvaded zone, since Rt is the best measure of the possibility of oil existing in the formation. However, the existance of the flushed and transition zones in the formation adjacent the wellbore wall adversely affect a measurement of Rt. Therefore, since large amounts of money may be spent based on the resistivity log presented to the client, it is important to understand the true resistivity of the formation in the flushed and transition zones in order to improve the accuracy of the resistivity log in general. Prior art well logging tools function to log the formation and generate signals, which signals are processed by a well logging truck computer situated at the well surface. The well truck computer produces a resistivity log. For a particular depth in the wellbore, the shape of a resistivity radial profile (hereinafter, resistivity profile), produced by the prior art well tool at the particular depth and extending radially outward from a point at the wellbore wall, is shown in FIG. 3. In FIG. 3, the resistivity profile indicates a flushed zone resistivity "Rxo", an uninvaded zone (true) resistivity "Rt", and a transition zone resistivity represented by an abrupt step function indicated generally by the diameter of invasion symbol "di". This step function transition zone resistivity does not accurately reflect the true resistivity distribution of the transition zone in the wellbore; therefore, the value of the resistivity Rt of the uninvaded zone is also adversely affected. The resistivity of the transition zone does not change abruptly as shown in FIG. 3; rather, it changes gradually as shown in FIG. 1b. Therefore, the resistivity profile generated by the prior art well logging tool was at least partially inaccurate.

SUMMARY OF THE INVENTION

Accordingly, it is a primary object of the present invention to provide a system which improves the accuracy of a resistivity log illustrated on an output record medium.

It is a further object of the present invention to provide the system for improving the accuracy of the resistivity log, which system generates invasion parameters which are useful for plotting the more accurate resistivity log on an output record medium.

It is a further object of the present invention to generate the invasion parameters useful for providing more details of the transition between flushed zone resistivity and uninvaded zone resistivity thereby plotting a more accurate resistivity log on an output record medium.

These and other objects of the present invention are accomplished by providing a system which receives output signals from a well tool (hereinafter termed the Array Induction Tool or AIT) adapted to be disposed in a wellbore and, after appropriate processing of the signals, generates a set of invasion parameters which are used for plotting a resistivity log on an output record medium. The invasion parameters include Rxo, the flushed zone resistivity; Rt, the uninvaded zone resistivity; and two other parameters not previously known, the "w" parameter and the "N" parameter. "w" represents the midpoint of the transition zone region on the resistivity log and "N" represents a value related to the slope of the resistivity log in the transition zone region. Given the four parameters, Rxo, Rt, w, and N, a more accurate resistivity log may be generated and illustrated on an output record medium for presentation to a client. The system uses an iterative procedure wherein physical values of Rxo, Rt, w, and N are selected. To do this, an additional constraint value is needed. A cost function "chi-squared", a function of the squares of differences between measured and modelled apparent conductivity (the reciprocal of resistivity), is computed. The chi-squared cost function is then minimized. The chi-squared cost function is minimized using a search procedure which first determines if the difference between the new versus old chi-squared changed less than a desired amount a required number of times, and secondly determines if the ratio of the constraint to the chi-squared has resulted in a required a-priori value a required number of times in a row. If the answer is yes, the chi-squared is minimized, and the parameters utilized to determine the minimum chi-squared are the required invasion parameters used to plot the more accurate and improved resistivity log output record medium. If the answer is no, other values of Rxo, Rt, w, and N are selected, and the process repeats iteratively until a minimum value of the chi-squared cost function is achieved, at which point, the parameters used to obtain the minimum value of chi-squared are selected to be the required invasion parameters. These invasion parameters Rxo, w, N, and Rt are used to plot a resistivity log similar to the log shown in FIG. 1b, one which reflects a more accurate resistivity radial profile in the transition zone.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIG. 3 illustrates a resistivity curve synthesized by a prior art well logging tool for a particular depth in a wellbore showing an abrupt step function to illustrate the resistivity of the formation in the vicinity of the transition zone;

FIG. 4 illustrates a resistivity curve which describes the inventive concept in accordance with the present invention showing a gradual transition of the resistivity of the formation in the vicinity of the transition zone;

FIG. 5a illustrates a diagram of depth in a borehole versus radius, the diagram depicting the flushed zone, the transition zone and the uninvaded zone versus depth for a typical borehole;

FIG. 5b illustrates a resistivity log or diagram of depth in a borehole versus resistivity;

FIG. 6 illustrates a system in accordance with the present invention for improving the accuracy of a resistivity log on an output record medium, the system incorporating the inventive concept set forth in FIGS. 4 and 5;

FIG. 7 illustrates a further construction of the well truck computer associated with the system of FIG. 6;

FIG. 16 illustrates six parameter maximally flat profiles with conductive annulus with break points of w1=10 and w2=30 in;

DESCRIPTION OF THE PREFERRED EMBODIMENT

The Description of the Preferred Embodiment is subdivided into two sections:

(1) A Description of the Preferred Embodiment, which provides a broader, more easily understandable description of the system of the present invention for generating invasion parameters associated with the transition zone in a formation traversed by a wellbore and for plotting a new, more accurate log on an output record medium, and (2) A Detailed Description of the Preferred Embodiment which provides a more detailed description of such system of the present invention.

Referring to FIG. 4, a resistivity curve plotted using invasion parameters determined in accordance with the present invention is illustrated. In FIG. 4, the flushed zone resistivity 14 is Rxo, the uninvaded zone resistivity 16 is Rt, and the transition zone resistivity 10 is a gradual decrease from Rxo to Rt. The flushed zone 14 extends a radius r1 from the borehole wall radially into the formation; the uninvaded zone begins at a radius r2 from the borehole wall and extends into the formation. Therefore, the transition zone lies within a region defined between radii r2 and r1. In FIG. 4, the transition zone resistivity 10 changes gradually from Rxo to Rt, and not abruptly as shown in FIG. 3. A full understanding of the transition zone resistivity must be achieved in order to obtain a true and accurate reading of the uninvaded zone resistivity Rt. Furthermore, a true and accurate reading of Rt must be obtained to determine if oil exists in the formation traversed by the borehole.

Referring to FIG. 5a, a diagram of depth in a borehole versus radius is illustrated, the diagram depicting the radial extension of the flushed zone, the transition zone, and the uninvaded zone over a plurality of depths in a borehole. For example, in FIG. 5, the flushed zone extends from the borehole wall to radius r1; the transition zone extends from radius r1 to radius r2, and the uninvaded zone extends from radius r2 radially outward into the formation. Notice that there is a distinct difference between radius r2 and radius r1, indicating that the radial width of the transition zone is more than an abrupt step function, as in FIG. 3.

Referring to FIG. 5b, a resistivity log or diagram of depth in a borehole versus resistivity is illustrated. In this example, the lowest reading of resistivity is the uninvaded zone resistivity Rt (the conductivity is the highest). The highest reading of resistivity, relative to the other zones, is the flushed zone resistivity Rxo (the conductivity is the lowest).

FIGS. 17–24, to be discussed in more detail later in this specification, illustrate actual curves of resistivity and conductivity versus radius into the borehole, these curves illustrating the gradual change in resistivity or conductivity between the flushed zone and the transition zone, and not an abrupt change as shown in FIG. 3.

Figure 25:
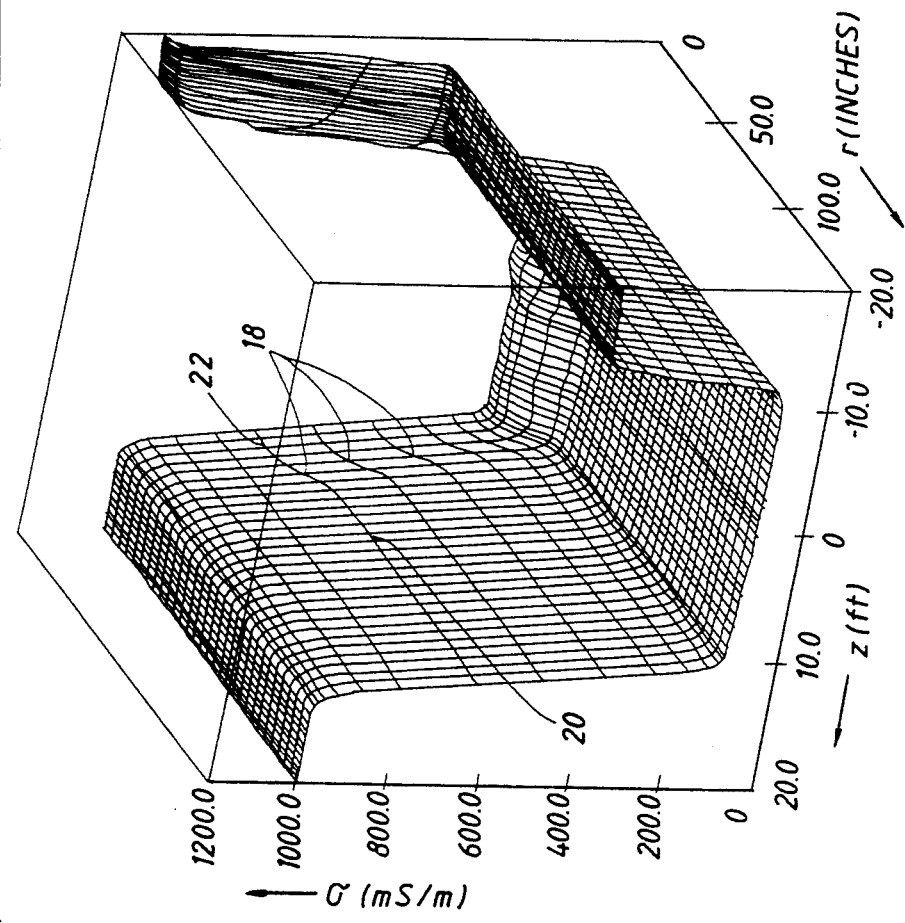
FIG. 25 illustrates a resistivity log in three dimensions, one dimension being conductivity (reciprocal of resistivity), one dimension being depth in borehole, and a third dimension being radius into the formation at the particular depth.

FIG. 25, to be discussed later in this specification, illustrates a three dimensional view of the resistivity curve of FIG. 4, the three dimensions being depth in borehole (z in feet), radius (r in in) into the formation at a particular depth, and amplitude of conductivity (sigma), which is the reciprocal of resistivity. Note the gradual change in conductivity, at 18, between the flushed zone 20 and the uninvaded zone 22.

Referring to FIG. 6, a system for improving the accuracy of a resistivity log on an output record medium is illustrated, the system utilizing the principles of the inventive concept set forth in FIGS. 4 and 5.

In FIG. 6, the system of the present invention includes a computer including its hardware which stores in its memory a special software hereinafter termed the invasion parameter determination software. The computer, in the context of the present invention, is a well logging truck computer, disposed in a well logging truck, situated at the surface of a wellbore. A well logging tool 24 is connected to the well truck computer, the well tool 24 suspending by wireline in the wellbore. A winch 11 raises and lowers the tool 24 in the wellbore and depth wheel sensor 13 measures the depth of the tool 24 in the wellbore. The computer may be one of the following computer systems manufactured by Digital Equipment Corporation (DEC), Maynard, Mass.: (1) DEC VAX 6430, (2) DEC PDP-11, or (3) DEC Vaxstation 3100.

Referring to FIG. 7, a more detailed construction of the computer of FIG. 6 is illustrated. In FIG. 7, the computer comprises a processor 30 connected to a system bus 32, a memory 34 storing the invasion parameter determination software 34a also connected to the system bus 32, and a color graphics recorder 36 connected to the system bus 32. In operation, the processor 30 executes the instructions (the invasion parameter determination software 34a) stored in memory 34 and generates an output record medium (see FIGS. 5a and 5b) on the color graphics recorder 36 for presentation to a client. The client uses the output record medium to quantify oil existing in the formation traversed by the borehole.

Figure 1A:
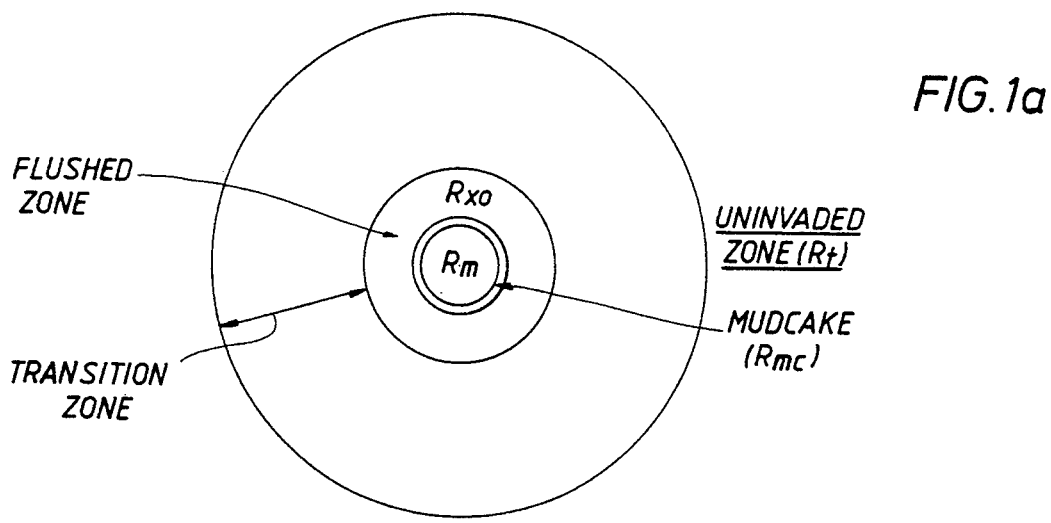
FIG. 1a illustrates a horizontal section through a permeable water bearing bed.
Figure 1B:
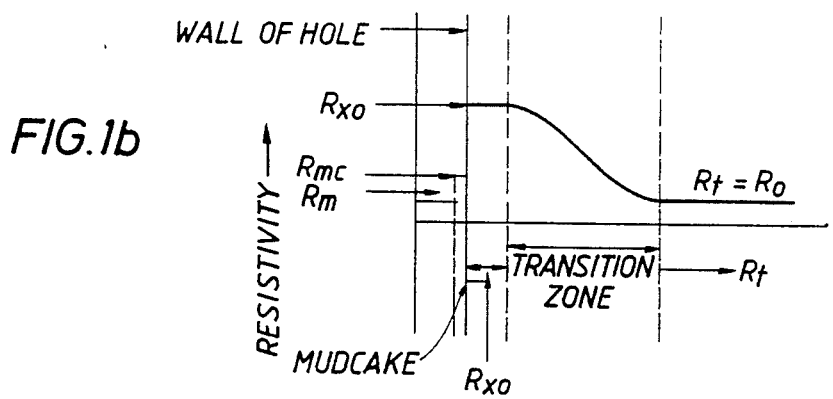
FIG. 1b illustrates a radial distribution of resistivities in the water bearing bed.
Figure 2A:
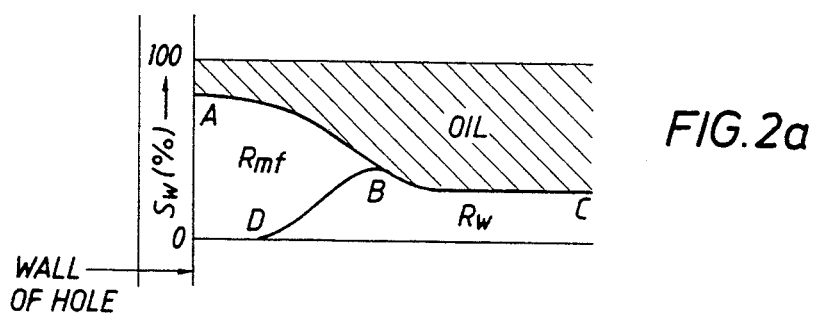
FIG. 2a illustrates a radial distribution of fluids in the vicinity of the borehole in a oil bearing bed.
Figure 2B:
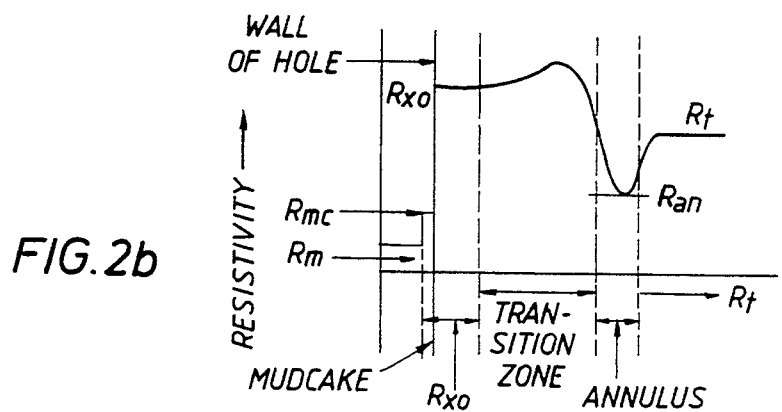
FIG. 2b illustrates a radial distribution of resistivities in the oil bearing bed.
Figure 8:
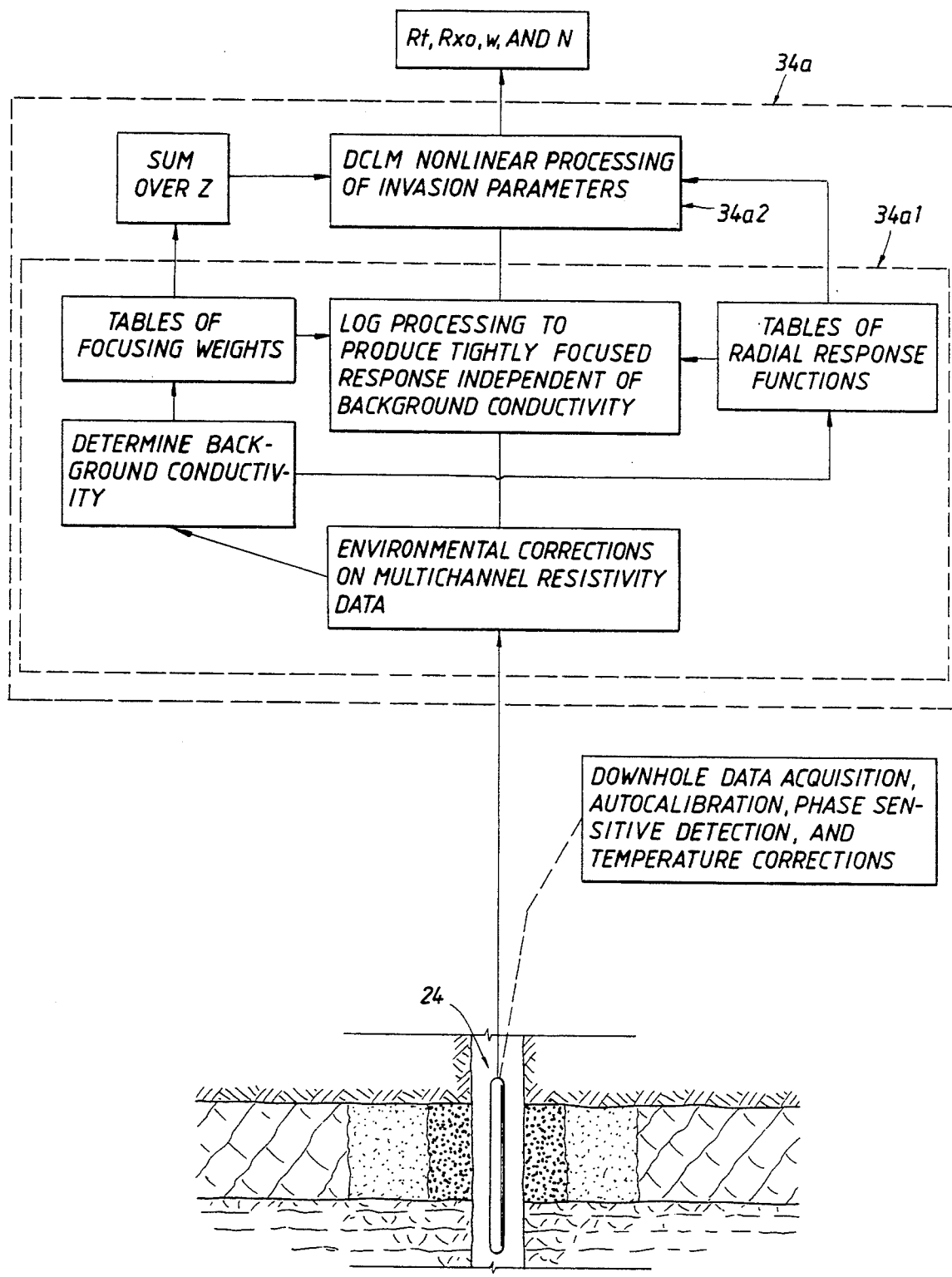
FIG. 8 illustrates a block diagram of the software resident in the memory of the well truck computer of FIG. 6, the software including processing software set forth in another application, identified below, and the invasion parameter determination software in accordance with at least part of the present invention which receives an output from the processing software and generates the invasion parameters needed to plot a more accurate resistivity log.

Referring to FIG. 8, the invasion parameter determination software 34a stored in memory 34 of FIG. 7 is illustrated. In FIG. 8, the invasion parameter determination software 34a comprises a pre-processing block 34a1 and an invasion parameter processing block 34a2 (entitled DCLM nonlinear processing of invasion parameters) in accordance with the present invention.

The pre-processing block 34a1 is discussed in detail in U.S. Pat. No. 5,157,605 to Chandler et al, entitled "Induction Logging Method and Apparatus Including Means for Combining In-Phase and Quadrature Components of Signals Received at Varying Frequencies and Including Use of Multiple Receiver Means Associated with a Single Transmitter", the disclosure of which is incorporated by reference into this specification.

In general, the pre-processing block 34a1, as described in the above referenced Chandler patent, acquires both the in-phase and quadrature components of each receiver array signal, at several frequencies, transmitted from a plurality of receiver arrays inherent in the well tool 24, and a response function is shaped by using a multi channel deconvolution filter. The basic equation of multi-channel deconvolution, as set forth in the U.S. Pat. No. 5,157,605 to Chandler et al already incorporated herein by reference, is:

$$\sigma_d(z) = \sum_{n=1}^{N} \sum_{z'=z_{nmin}}^{z_{nmax}} \sigma_n(z - z')a_n(z') \quad (A)$$

where the subscript n refers to the channel number and $sigma_n(z)$ is the conductivity measured by the nth array at position z. The summation goes from channel 1 to channel N and from $z_{nmin}$ to $z_{nmax}$, the minimum and maximum log interval depth for each channel. The a's are the filter coefficients. This equation implies that the signal from a set of N arrays will be obtained at a number of positions and will be weighted and added to obtain a log value. The values of the filter coefficients (the a's) as well as the choice of independent arrays will determine the tool response. Because the arrays have a response which can be written in the form of the equation above, the total response of the multichannel sonde can be written in the same general form:

$$\sigma_d(z) = \int_{-\infty}^{\infty} dz' \int_{-\infty}^{\infty} d\rho \, g_d(\rho, z - z')\sigma(\rho, z') \quad (B)$$

where $$g_d(\rho, z) = \sum_{n=1}^{N} \sum_{z'=z_{nmin}}^{z_{nmax}} g_n(\rho, z - z')a_n(z') \quad (C)$$

Figure 10A:
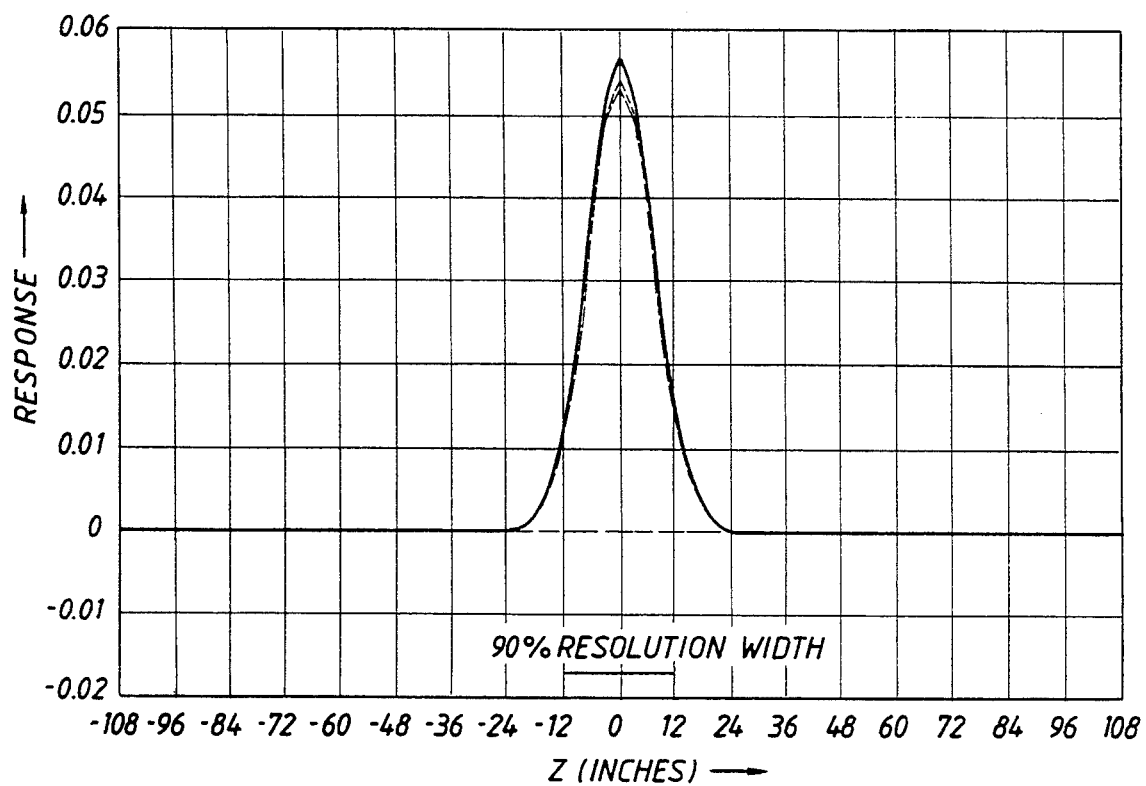
FIGS. 10a and 10b illustrate vertical response functions.
Figure 10B:
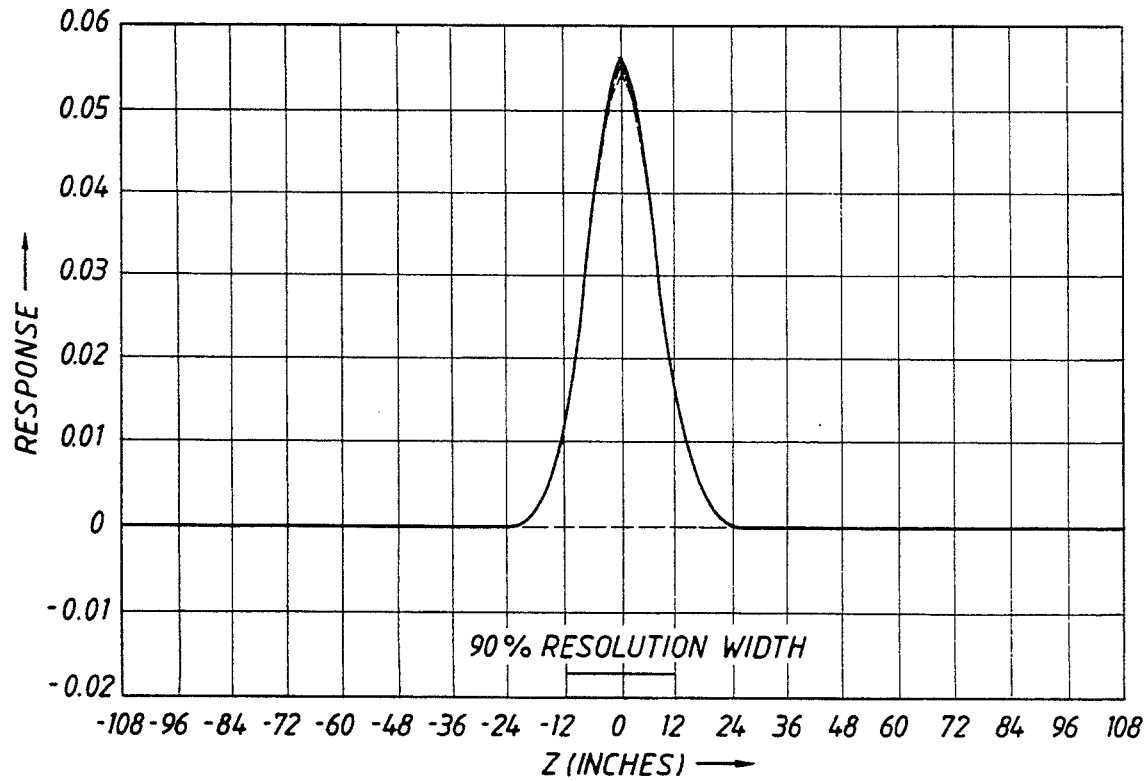

To be more specific, the pre-processing block 34a1 processes the in-phase and quaduature components of each receiver array signal into an output signal representative of the characteristic of a formation traversed by a borehole. The pre-processing block 34a1 processes the inphase and quadrature components of each receiver array signal, not only at several different frequencies, but also at several different vertical depths in the borehole, in accordance with the above multichannel deconvolution equation, to produce the output signal representative of the characteristic of the formation. The block 34a1 performs the above referenced pre-processing by implementing several distinct steps, as noted in FIG. 8:

1. the block 34a1 performs environmental corrections on multichannel resistivity data;

2. it determines background conductivity which is input to a table of radial response functions and to a table of focusing weights; and 3. based on the environmental corrections, the tables of focusing weights and the tables of radial response functions, using the multichannel deconvolution equation above, the pre-processing block 34a1 produces a tightly focused response (see FIG. 10) independent of background conductivity, which tightly focused response (and in particular, the "$sigma_d(z)$" part of the above equation) is input to the invasion parameter processing block 34a2 of FIG. 8.

The invasion parameter processing block 34a2, in accordance with the present invention, receives the "$sigma_d(z)$" tightly focused response from the pre-processing block 34a1 and generates a set of invasion parameters Rxo, w, N, and Rt, where Rxo is the resistivity of the invaded zone, Rt is the true resistivity of the uninvaded zone, and w and N are parameters related to the resistivity of the transition zone, and where w is the midpoint of the resistivity curve in the transition zone, and N is related to the slope of the resistivity curve in the transition zone.

Figure 9A:
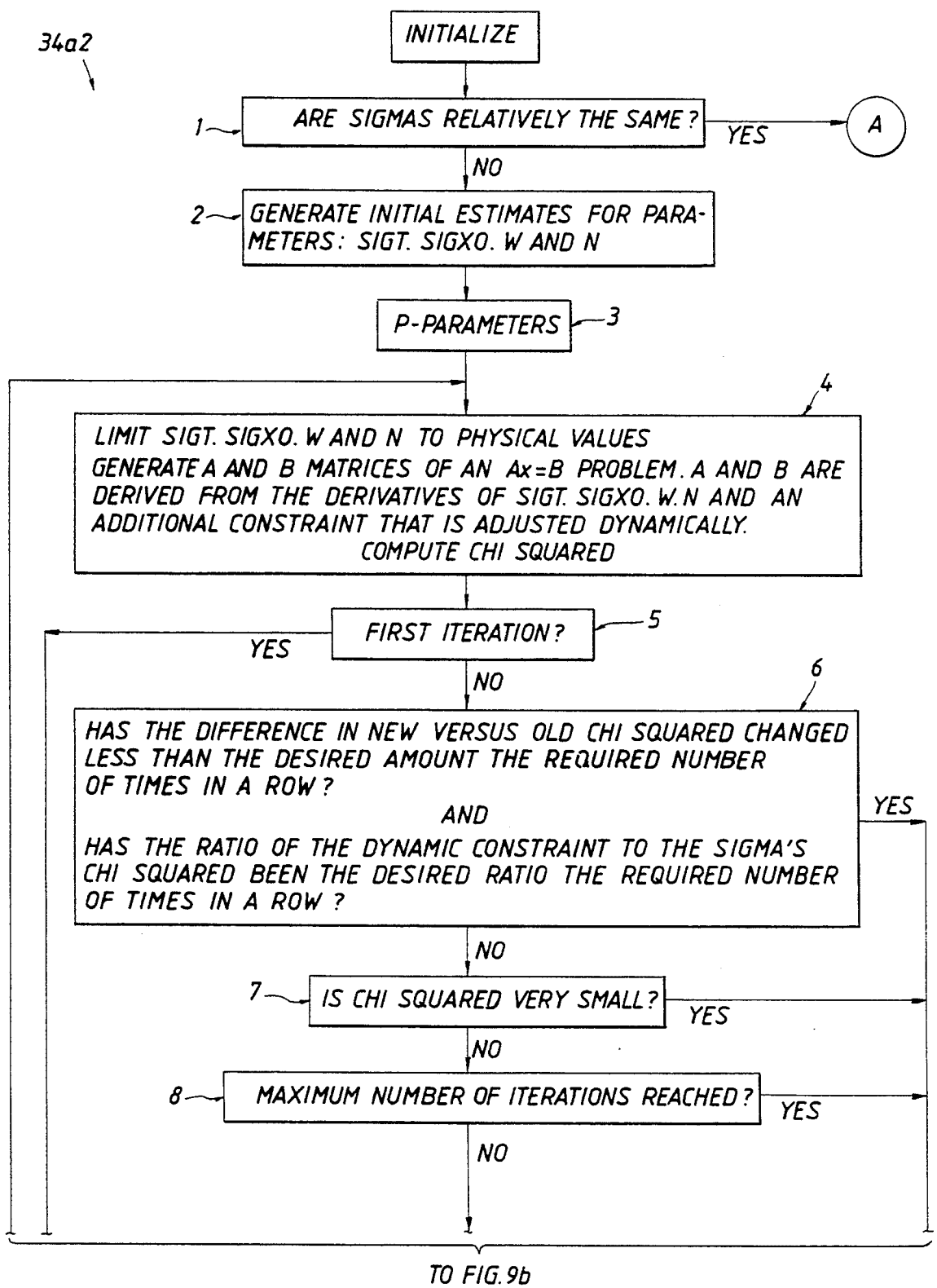
FIGS. 9a and 9b illustrate detailed construction of the invasion parameter determination software in accordance with the present invention.
Figure 9B:
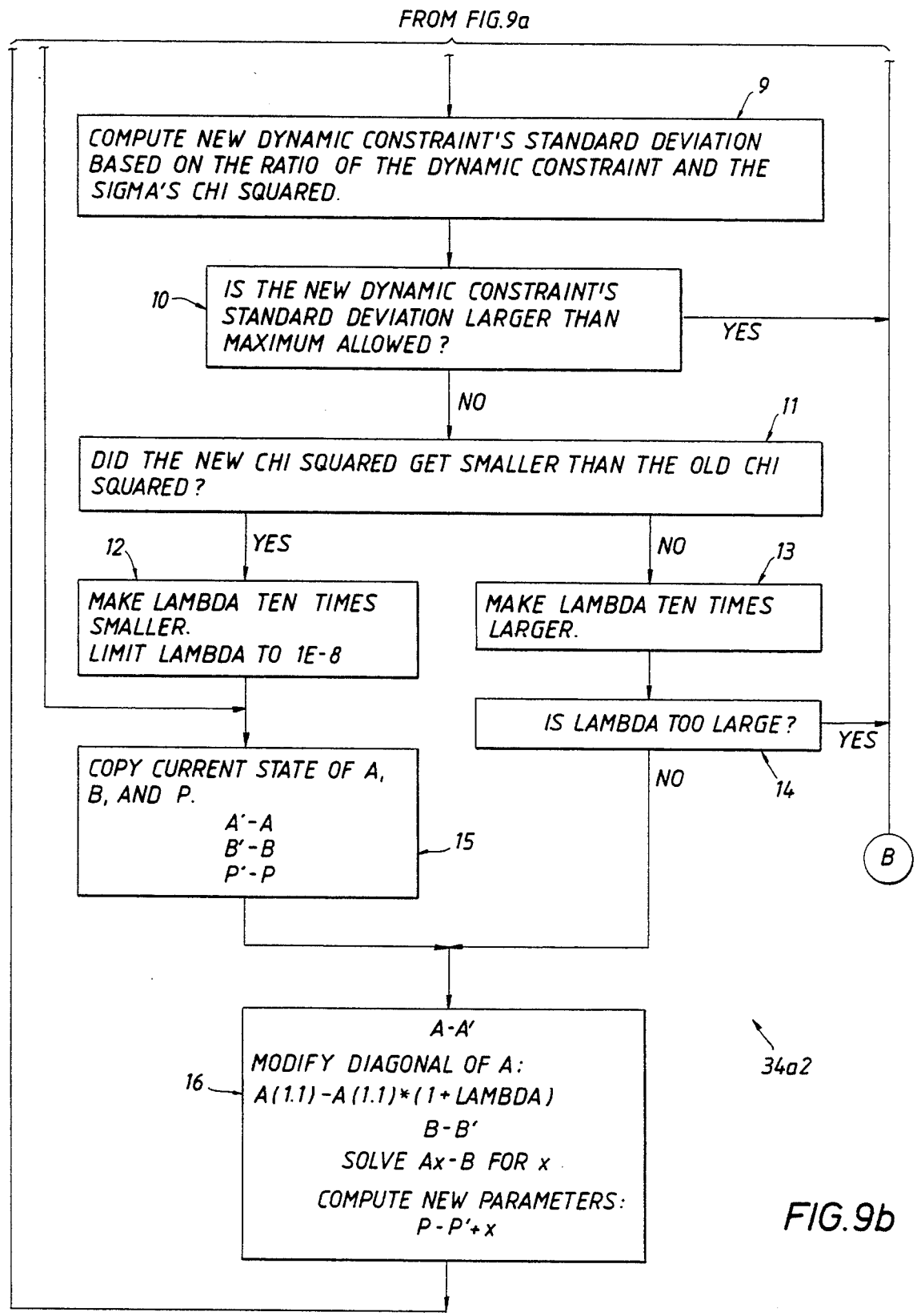

Referring to FIG. 9, a block diagram of the invasion parameter processing block 34a2 of FIG. 8, in accordance with the present invention, is illustrated.

In FIG. 9, the purpose of the invasion parameter processing block 34a2 is to determine the following invasion parameters: Rxo, Rt, w, and N. The invasion parameters enable one to plot a resistivity radial profile for the invaded zone, the uninvaded zone, and the transition zone, the zone interposed between the invaded zone and the uninvaded zone of the formation traversed by the borehole. The resistivity radial profile for the transition zone is a gradual one, not abrupt in nature; therefore, the resistivity radial profile is more accurate in terms of its reflection of the actual resistivity of the formation traversed by the borehole. If one knows Rxo, the resistivity of the invaded zone, and Rt, the resistivity of the uninvaded zone, one must also know two more parameters to plot the resistivity radial profile for the transition zone: w, the midpoint of the transition zone, and N, a value related to the slope of the resistivity radial profile between Rxo and Rt. The invasion parameter processing block 34a2 has several steps. Each of these steps are discussed in the following paragraphs.

1. It is necessary to determine if there is a transition zone in the first place; if there is no transition zone, there is no need to determine invasion parameters for the purpose of determining the resistivity in that zone of the formation. Consequently, in FIG. 9, the first block 1 asks "are sigmas relatively the same?"; in other words, is Rxo (resistivity "R" is the reciprocal of conductivity "sigma") approximately equal to Rt? If they are, there is no need to determine invasion parameters since the resistivity radial profile is relatively flat; therefore, exit the invasion parameter processing block.

2. If the sigmas (reciprocal of Rxo and Rt) are not relatively the same, generate initial estimates for the invasion parameters Rxo, w, N, and Rt; the next block 2 directs "generate initial estimates for parameters: sigt, sigxo, w, and N".

3. Let P=invasion parameters (reciprocal of Rxo, w, N, and reciprocal of Rt), block 3.

4. For block 4, (a) limit the invasion parameters (sigxo, sigt, w, and N) selected in blocks 2 and 3 to physical values, (b) generate A and B matrices of an Ax=B problem, where A and B are derived from the derivatives of the invasion profile model with respect to the model parameters "sigt, sigxo, w, and N" and an additional constraint that is adjusted dynamically, and (c) compute chi-squared.

To explain the steps of block 4 further, reference is directed to equations 30 and 31 duplicated below, equations 30 and 31 being discussed in detail in the Detailed Description of the Preferred Embodiment set forth below:

$$\chi^2(m) = \sum_{i=1}^{M_c} |(\sigma_{ai} - \sigma_a(m))/\sigma_i|^2, \quad (30)$$

$$\chi^2(m) = \gamma - \beta \cdot m + 1/2 m \cdot H \cdot m + \ldots, \quad (31)$$

Equations 30 and 31 each represent the cost function chi-squared "$chi^2(m)$" referenced above, where "$chi^2(m)$" is a function of: (1) "sigma$_a(z)$" from equations (A) and (b) above, and (2) "m", where "m" is a vector which includes the invasion parameters sigxo, sigt, w, and N as specifically set forth in equations 28 of the Detailed Description, duplicated below as follows:

$$m_1 = \sigma_{xo},$$

$$m_2 = \sigma_t,$$

$$m_3 = \omega,$$

$$m_4 = N. \quad (28)$$

The term "sigma$_{ai}$" from equation 30 above is equal to the term "sigma$_a(z)$" from equations (A) and (B) above, the term "sigma$_a(z)$" being the output of the pre-processing block 34$a$1.

The main objective in this and the following analyses is to first select values for the invasion parameters (sigxo, sigt, w, N) and insert the selected invasion parameter values into the chi-squared function cost thereby producing a first result. Other values of the invasion parameters are computed by the search algorithm and inserted into the chi-squared cost function producing a second result. The first result is compared with the second result to determine if the results are decreasing. This process repeats iteratively. When the chi-squared "$chi^2(m)$" function achieves a minimum value, the particular invasion parameters used to generate the minimum chi-squared function are selected to be a desired set of invasion parameters which are used for plotting the new and more accurate resistivity profile, and in general, a more accurate resistivity log on an output record medium, the resistivity log representing the resistivity or conductivity of the flushed (invaded) zone, the transition zone, and the uninvaded zone of the formation traversed by the borehole.

Equation 32 of the Detailed Description is duplicated below as follows:

$$\nabla X^2(m) = 0, \quad (32)$$

It is noted in equation 32 that a necessary, but not sufficient, condition for achieving a minimum of the chi-squared "$chi^2(m)$" function is that the gradient or derivative of chi-squared, as a function of the vector "m", be zero. However, for several reasons as noted in equation 40, set forth below it is necessary to append an additional constraint "$C(m)$" to the above referenced $chi^2(m)$ function (the above referenced $chi^2(m)$ function being hereinafter called "$chi_0^2(m)$") thereby yielding the following new chi-squared function from which the desired set of invasion parameters are determined:

$$chi^2(m) = chi_0^2(m) + C(m) \quad (40)$$

5. Is this the first iteration, block 5? If yes, implement blocks 15 and 16 to be described below and return to block 4; otherwise, if no, implement block 6, the next step in the process.

6. In block 6, (a) has the difference in the new versus old chi-squared "$chi^2(m)$" changed less than the desired amount a required number of times in a row, and (b) has the ratio of the dynamic contraint "$C(m)$" to the sigma's chi-squared "$chi_0^2(m)$" been the desired ratio the required number of times in a row during the iterations? If yes, exit. If no, go to block 7, the next step.

Equations 30 and 31, duplicated above and discussed in detail in the Detailed Description, provide the chi-squared "$chi^2(m)$" function as a function of the argument "m", which according to equation 28, is a vector whose elements are the invasion parameters sigxo, w, N, and sigt, where sigxo is "sigma xo", a conductivity, the reciprocal of Rxo, and sigt is "sigma t", reciprocal of Rt. After each iteration, $chi^2(m_{new})$ is compared with $chi^2(m_{old})$. Equation 35 defines $m_{new}$ as a function of $m_{old}$ and equation 36 defines a variable L as a function of lambda, as follows:

$$m_{new} = m_{old} + L^{-1}(-\nabla X^2(m_{old})), \quad (35)$$

$$L_{nm} = (1 + \lambda \delta_{nm}) H_{nm}, \quad (36)$$

If $chi^2(m_{new})$ is smaller than $chi^2(m_{old})$, lambda is decreased by a factor of 10, otherwise lambda is increased by a factor of 10. $m_{old}$ is set equal to $m_{new}$ and the iteration continues until convergence is achieved.

Equations 41 and 45 of the Detailed Description are duplicated below as follows:

$$C(m) = |(\sigma_{aNc+1} - \sigma_{aNc+1}(m))/\sigma_{Nc+1}|^2, \quad (41)$$

where $$\sigma_{aNc+1}(m) = \sum_{k=1}^{N_P} ((m_k - m_{0k})/\sigma_{mk})^2,$$

$$\sigma_{aNc+1} = 0.$$

$$C(m)/\chi_0^2(m) = \gamma. \quad (45)$$

Furthermore, as noted in equations 41 and 45, dynamic conditioning results from relative weighting of a constraint standard deviation "sigma$_{Nc+1}$" such that the ratio of the constraint $C(m)$ to model data chi-squared "$chi_0^2(m)$" is kept at a constant desired ratio. Therefore, as noted in equation 45, the ratio of the dynamic constraint "$C(m)$" to the sigma's chi-squared "$chi_0^2(m)$" must be a desired ratio (gamma) a required number of times.

7. In block 7, is chi-squared very small? If yes, exit the routine. If no, go to step 8.

Recall that the main objective of the invasion parameter processing block 34$a$2 is to minimize the chi-squared function and to select the invasion parameters, used to minimize the chi-squared function, as the desired parameters needed to plot the new and more accurate resistivity log on an output record medium. The resistivity log represents the resistivity or conductivity of the flushed (invaded) zone, the transition zone, and the uninvaded zone of the formation traversed by the borehole. If chi-squared is very small, it has been minimized; therefore, the desired invasion parameters are known.

8. In block 8, has the maximum number of iterations been reached? If yes, exit the routine. If no, go to step 9.

The number of iterations required to achieve the minimum chi-squared function cannot exceed a predetermined number. Convergence occurs when the minimum chi-squared is achieved; and it is expected prior to the implementation of the predetermined number of iterations.

9. In block 9, compute new dynamic constraint's standard deviation based on the ratio of the dynamic constraint and the sigma's chi-squared and go to step 10.

Since, from block 6, it was determined that the ratio of the dynamic constraint to the sigma's chi-squared has not been the desired ratio (equation 45) the required number of times in a row, it is necessary now to compute a new dynamic constraint C(m). To do this, however, a dynamic constraint standard deviation must be computed. In equation 41, an equation for the constraint C(m) is written in terms of a dynamic constraint standard deviation "sigma$_{Nc+1}$", where this dynamic constraint standard deviation appears in the denominator of equation 41. In equation 45, the ratio of the constraint C(m) to chi-squared must always be equal to a constant "gamma". Step 9 indicates that the standard deviation "sigma$_{Nc+1}$" must be carefully chosen in equation 41 to produce a particular C(m), where, from equation 45, the ratio of the particular C(m) to chi-squared is equal to the constant "gamma".

10. In block 10, is the new dynamic constraint's standard deviation larger than maximum allowed? If yes, exit the routine, otherwise, if no, go to step 11.

11. In block 11, did the new chi-squared get smaller than the old chi-squared? If yes, go to step 12, otherwise, if no, go to step 13.

Recall from step 5/block 5 that this is not the first iteration. Therefore, a new chi-squared has been computed and an old chi-squared has been computed. One of the major objectives of the invasion parameter processing block 34a2 is to minimize chi-squared and to select the invasion parameters which generated the minimum chi-squared to be the desired or "best fit" invasion parameters for the purpose of plotting the transition zone resistivity on a resistivity log output record medium. If the new chi-squared did get smaller than the old chi-squared, go to step 12, otherwise, if not, go to step 13.

12. In block 12, make lambda ten times smaller; limit lambda to 1E-8; and go to step 15.

13. In block 13, make lambda ten times larger and go to step 14.

In steps 12 and 13/blocks 12 and 13, equation 35 is the vector "$m_{new}$" defined to be a function of "$m_{old}$" and an additional term which contains $L^{-1}$, where "L" is defined by equation 36 to be a function of lambda. After each iteration, "chi$^2$($m_{new}$)" is compared with "chi$^2$($m_{old}$)". If chi$^2$($m_{new}$) is smaller, it is still being minimized; therefore, lambda is decreased by a factor of ten (10); otherwise, if not, lambda is increased by a factor of ten (10); then, $m_{old}$ is set equal to $m_{new}$ and the iteration continues until convergence is achieved.

14. In block 14, is lambda too large? If yes, exit the routine; otherwise, if no, go to step 16.

15. In block 15, copy current state of A, B, and P, setting A'=A, B'=B, and P'=P, and go to step 16.

16. In block 16, set A=A', modify diagonal of A:A(i,i)=A(i,i)*(1+lambda); set B=B', solve Ax-B for x;

compute new parameters P-P'+x and return to step 4/block 4.

DETAILED DESCRIPTION OF THE PREFERRED EMBODIMENT

1. Pseudo Response Functions

From a measurement point of view, the apparent conductivity of the i$^{th}$ median curve $\sigma_{ai}$, is related through response function theory to the underlying formation by $$\sigma_{ai} = \sum_{m=1}^{N_R} w_{im}\sigma_m, \qquad (1)$$

where $\sigma_m$ is the digitized pixel value of the radial conductivity profile at radius $\rho=\rho_m$, $N_R$ is the number of radial pixels which is taken to be between 60 and 100, and the weighting function $\omega_{im}$ is to be determined.

Eqn. (1) as it stands is not useful for the estimation problem. The complete definitions are lacking, the physics of invasion which determine the shape of the radial profile is not imposed, and the tool physics which relates the response to the formation is missing. The tool physics enters through pseudo response functions based upon rigorous radial field expansions of Maxwell's equations [8]. The concept of pseudo response functions can be found in a book by Titman [9]. For this application, note that a radial conductivity profile containing a single step function, i.e.

$$\sigma(\rho)=\sigma_0+\Delta\sigma\mu(\rho-\rho_0), \qquad (2)$$

defines in a natural way the pseudo response function $J^j(\rho)$ for the j$^{th}$ induction array (j=1,2, . . . ,N$_c$) through the apparent conductivity relation $$\sigma_a^j = \sigma_{a0}^j + \Delta\sigma \int_0^\infty J^j(\rho)u(\rho - \rho_0)d\rho. \qquad (3)$$

Noting that the derivative of the unit step function $\mu(\rho-\rho_0)$ is the impulse function $\delta(\rho-\rho_0)$, it follows from eqn. (3) that $$J^j(\rho) = \frac{1}{\Delta\sigma}\frac{d\sigma_a^j}{d\rho_0}. \qquad (4)$$

For accurate computation of $\sigma_t$, it is advantageous to define a radial cumulative pseudo response function $J_c^j(\rho_0)$ as $$J_c^j(\rho_0) = \int_{\rho_0}^\infty J^j(\rho)d\rho. \qquad (5)$$

The advantage of this definition of response function is that the area from a fixed radius to infinity is computed accurately as the primary numerical result. Beyond the invaded zone this is the required quantity to yield optimum $\sigma_t$ estimates. For numerical computation with error of order O $(\sigma_{a1}-\sigma_{a2})^2$), a central difference scheme is used. Thus it is necessary to compute two apparent conductivities $\sigma_{a1}$ and $\sigma_{a2}$, viz:

$$\sigma_{a1}^j = \sigma_{a0}^j + \int_0^\infty J^j(\rho)(\sigma_1 - \sigma_0)d\rho, \qquad (6)$$

-continued $$\sigma_{a2}^j = \sigma_{a0}^j + \int_0^\infty J^j(\rho)(\sigma_1 + \Delta\sigma u(\rho - \rho_0) - \sigma_0)d\rho.$$

The desired partial cumulative response is then $$J_c^j(\rho_0) = \frac{\sigma_{a2} - \sigma_{a1}}{\Delta\sigma}. \quad (7)$$

It is convenient to normalize the response functions to have total unity gain. The definition is $$K^j(\rho) = J_c^j(\rho)/N^j(\sigma_0), \quad (8)$$

where $$N^j(\sigma_0) = \int_0^\infty J^j(\rho)d\rho. \quad (9)$$

Figure 11:
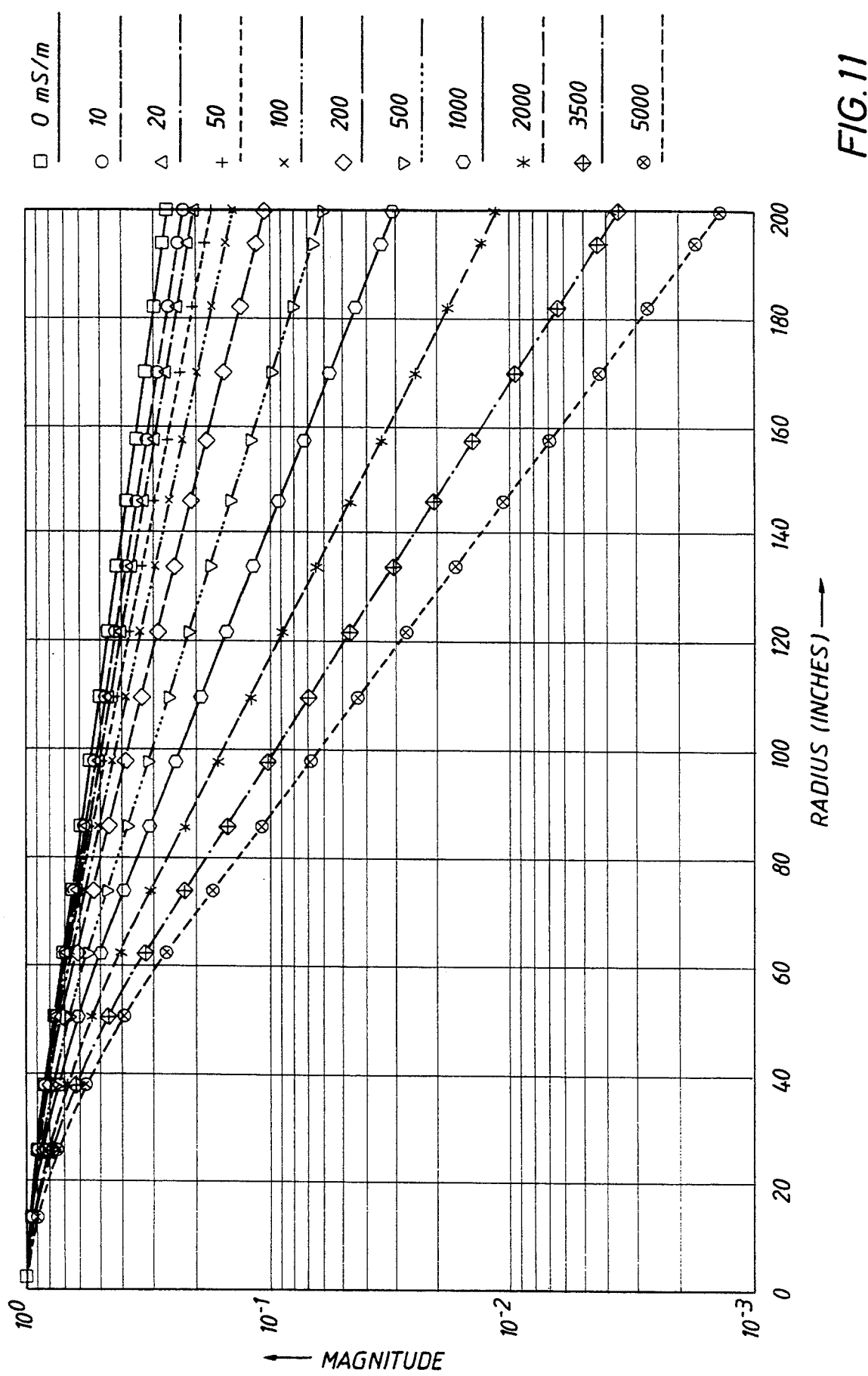
FIG. 11 illustrates a partial cumulative radial response function.

Note that $N^j = J_c^j(0)$. An example normalized partial cumulative radial response function computed by eqn. (8) for the 72 in. array is given in FIG. 11. In the next section, the pseudo response function will be used to deconvolve the formation conductivity. In appendix A, analytic forms of the normalization function are given for both the dipole and more general loop case.

2. Radial Deconvolution

In this section it is assumed that the formation varies only radially. Using the response functions defined in section 2, the apparent conductivity measured by the $j^{th}$ channel is simply $$\sigma_d^j = \int_0^\infty K^j(\rho)\sigma(\rho)d\rho. \quad (10)$$

The finite element model for the radial profile $\sigma(\rho)$ is $$\sigma(\rho) = \sum_{m=0}^{N_R} \sigma_m \Lambda_m(\rho) + \sigma_{N_R} u(\rho - \rho_{N_R}). \quad (11)$$

In eqn. (11), $\lambda_m(\sigma)$ is the $m^{th}$ triangular finite element defined as $$\Lambda_m(\rho) = \begin{cases} 1 - |\rho - \rho_m|/\Delta_m, & \text{if } \rho_{m-1} < \rho < \rho_m; \\ 1 - |\rho - \rho_m|/\Delta_{m+1}, & \text{if } \rho_m < \rho < \rho_{m+1}; \\ 0, & \text{otherwise.} \end{cases} \quad (12)$$

where $m = 1, 2, \ldots, N_R - 1$, $\Delta_m = \rho_m - \rho_{m-1}$, and $\rho_0 = 0$. Note in eqn. (10), that because of the normalization of the kernel functions $K^j$, it is not necessary to include an explicit additive background conductivity. Note also the $\rho$ axis subdivision need not be uniform, it is only necessary it be ordered, $\rho_0 < \rho_1 < \ldots < \rho_{N_R}$. The first and last triangular functions are special cases given by $$\Lambda_0(\rho) = \begin{cases} 1 - |\rho - \rho_0|/\Delta_1, & \text{if } \rho_0 < \rho < \rho_1; \\ 0, & \text{otherwise.} \end{cases} \quad (13)$$

and $$\Lambda_{N_R}(\rho) = \begin{cases} 1 - |\rho - \rho_{N_R}|/\Delta_{N_R}, & \text{if } \rho_{N_R - 1} < \rho < \rho_{N_R}; \\ 0, & \text{otherwise.} \end{cases} \quad (14)$$

and

The linear combination of the triangular functions in eqn. (11) yields a piecewise linear function over the entire finite element interval $(\rho_0, \rho N_R)$ and hence yields is a higher order expansion than one with piecewise constant elements. Beyond $\rho N_R$ the unit step function in eqn. (11) forces the profile to the constant $\rho N_R$. Substitution of eqn. (11) into eqn. (10) yields $$\sigma_d^j = \sum_{m=1}^{N_R} P_m^j \sigma_m, \quad (15)$$

where $$P_m^j = \int_{\rho_{m-1}}^{\rho_{m+1}} \Lambda_m(\rho) K^j(\rho) d\rho. \quad (16)$$

The finite element matrix $P_m^j$ can be written in terms of partial radial response functions defined by eqn. (7), i.e. let $$G_m^j = J_c^j(\rho_m)/N^j(\sigma_0). \quad (17)$$

Then the finite element matrix $P_m^j$ has the explicit representation $$P_m^j = \begin{cases} (1 - G_1^j)/2, & \text{if } m = 0; \\ (G_{m-1}^j - G_{m+1}^j)/2, & \text{if } 0 < m < N_R; \\ (G_{N_R - 1}^j + G_{N_R}^j)/2, & \text{if } m = N_R. \end{cases} \quad (18)$$

The partial cumulative response functions $G_m^j(\sigma_0)$ are computed and stored in table form on computer disk. The table consists of uniform 2 inch steps from 2 to 200 inches (m=1,2 ... 100), for each array (j=1,2, ... 36) and background conductivities $\sigma_0$=0, 0.01, 0,02, 0.05, 0.1, 0.2, 0.5, 1, 2, 3.5, and 5 S/m. A check on the normalization is made by choosing $\sigma_m = \sigma_c$ for all m. Then all curves should read the correct homogeneous value $\sigma_c$.

$$\begin{aligned}
\sigma_d^j &= \sum_{m=1}^{N_R} P_m^j \sigma_m, \quad (19) \\
&= \sigma_c \sum_{m=1}^{N_R} P_m^j, \\
&= \sigma_c/2(1 + G_0^j), \\
&= \sigma_c.
\end{aligned}$$

Figure 12:
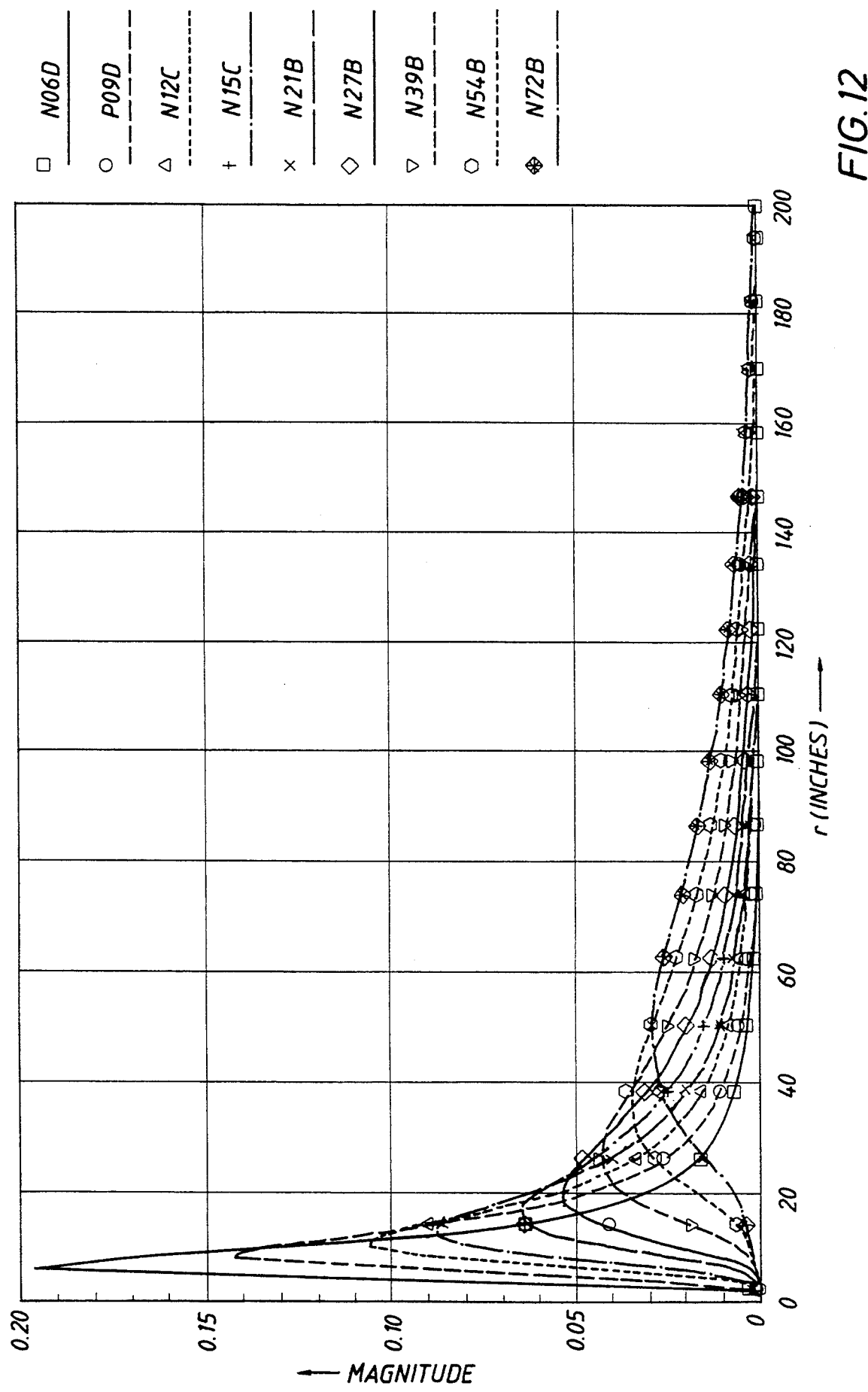
FIG. 12 illustrates differential radial response functions.

In eqn. (19), the fact $G_0^j = 1$, which follows from eqn. (8), is needed. As an example of the response functions $P_m^j$, the matrix is shown in FIG. 12 for background of 1 S/m for all arrays j. The abscissa is m converted to inches. An important point illustrated by FIG. 12 is that estimating the details of the shape of the conductivity profile beyond approximately 30–40 in. is not possible with only induction measurements. Thus the degree to which it is possible to focus the response radially beyond about 30–40 in. is much less than it is possible to focus the response vertically which leads to the sharp vertical focus yielding results given in FIG. 10. The reason for this is that the focus is achieved in the static limit of Maxwell's equations rather than by interference effects which are responsible for high resolution in microwave imaging where the size of the narrow beam forming antennas are more than a wavelength. Microwave imaging intrinsically allows much higher resolution as the distance from the source is increased. Of course in high loss media as encountered is well logging, skin effect is not negligible, and it is necessary to use induction methods. Then the ability to focus the quasi-static field is based upon the much more difficult and limited ability to shape near field source singularities. This ability degrades rapidly as one moves away from the borehole as evident in FIG. 12.

As discussed in the introduction, the primary measurements are combined to produce focused log apparent conductivity curves. Median curves are produced by linear combinations of the primary measurements of the form $$\sigma_{ai} = \sum_{j=1}^{N_c} w_i^j(\sigma_0) \sigma_{a}^j. \tag{20}$$

The index j is reserved for actual sonde data, while the index i is to be associated with the processed or median curves. The weights $\omega_i^j(\sigma_0)$ produce a focused log with median depths of investigation of 10, 20, 30, 60 and 90 inches, as i=1, 2, 3, 4 and 5. The weights are designed to have identical step responses for all curves (i) and background conductivity. In addition they are normalized such that $$\sum_{j=1}^{N_c} w_i^j(\sigma_0) = 1. \tag{21}$$

The focusing weights are designed by procedure outlined in reference [5]. It is important to note that the dependence on the vertical focusing property of the weights $\omega_i^j(\sigma_0)$ is implicit; the filter weights, which produce the median curves from the multi-channel sonde data, are summed over the vertical index (along the log axis) to produce $\omega_i^j(\sigma_0)$. Combining eqns. (15) and (20) results in $$\sigma_{ai} = \sum_{m=0}^{N_j} w_{im}(\sigma_0) \sigma_m, \tag{22}$$

where i=1,2, ..., $M_c$. Note eqn. (22) is eqn. (1), but where now the weight matrix $\omega_{im}(\sigma_0)$ is seen to be $$w_{im}(\sigma_0) = \sum_{j=1}^{N_c} w_i^j(\sigma_0) P_m^j(\sigma_0), \tag{23}$$

where $P_m^j(\sigma_0)$ are the tabulated radial response functions given by eqn. (18). This completes the description of the input curves $\sigma_{ai}$ which are the starting point for the estimation of the radial conductivity profile.

3. Parametric Profiles

The shape of the invasion profile is determined by the equilibrium mixture of connate water, mud filtrate and hydrocarbon in the pore space of formation rock. Wireline induction measurements are usually taken several hours to days after the hole is drilled. It is speculated that when the formation is oil wet, the mud filtrate in water based muds will preferentially displace the connate water which can result in a conductive annulus. Depending on the annulus thickness, conductivity contrast, and distance from the well bore, the electric measurement may or may not be sensitive to the presence of the annulus.

I have determined by eigen-analysis the number of significant eigenvalues associated with AIT radial response functions, to be six or seven. This is an upper bound under ideal conditions of the number of resolvable parameters in a radial profile. A heuristic argument for the number of resolvable parameters is that given the four curves, four parameters can be estimated. This is not always the case since the four curves can be equal to within noise as occurs for example in a tight rock formation.

Clearly with the AIT, it is possible and desirable to go beyond the traditional three parameter profile of flushed zone resistivity $R_{xo}$, formation resistivity $R_t$, and diameter of invasion $D_i$. It also is desirable to have the parameters part of the wellsite presentation rather than a tornado chart type of computation.

Invasion is a diffusion like process in terms of concentration gradient which on physical grounds must have a smooth transition between the flushed and non-invaded zones. It also can be argued that deeper invasion is associated with a wider effective transition region. In addition, by definition the flushed region, if it exists, will have zero slope radially, as does the non-invaded zone associated with $R_t$. A four parameter profile having these properties is the maximally flat profile. In electronic filter design theory, this function is the Butterworth filter [11]. For this application, given in conductivity units (S/m), the function is $$\sigma_4(\sigma) = \sigma_t + (\sigma_{xo} - \sigma_t)/[1 + (\rho/\omega)^N]. \tag{24}$$

Figure 13:
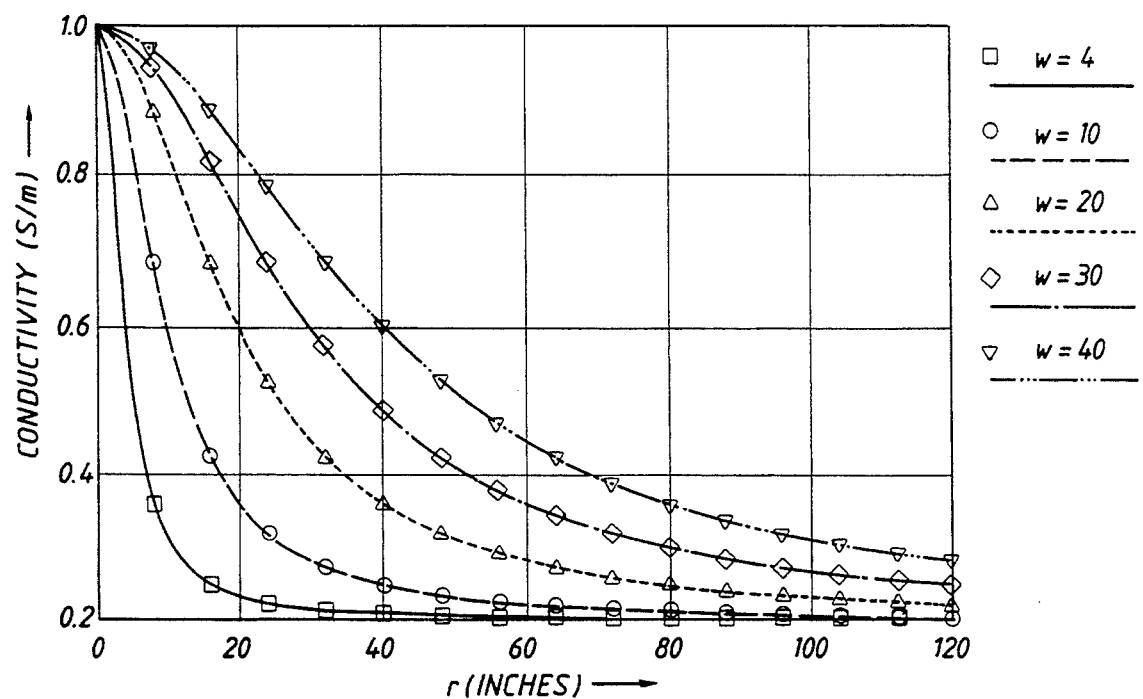
FIG. 13 illustrates four parameter maximally flat profiles for N=2.
Figure 14:
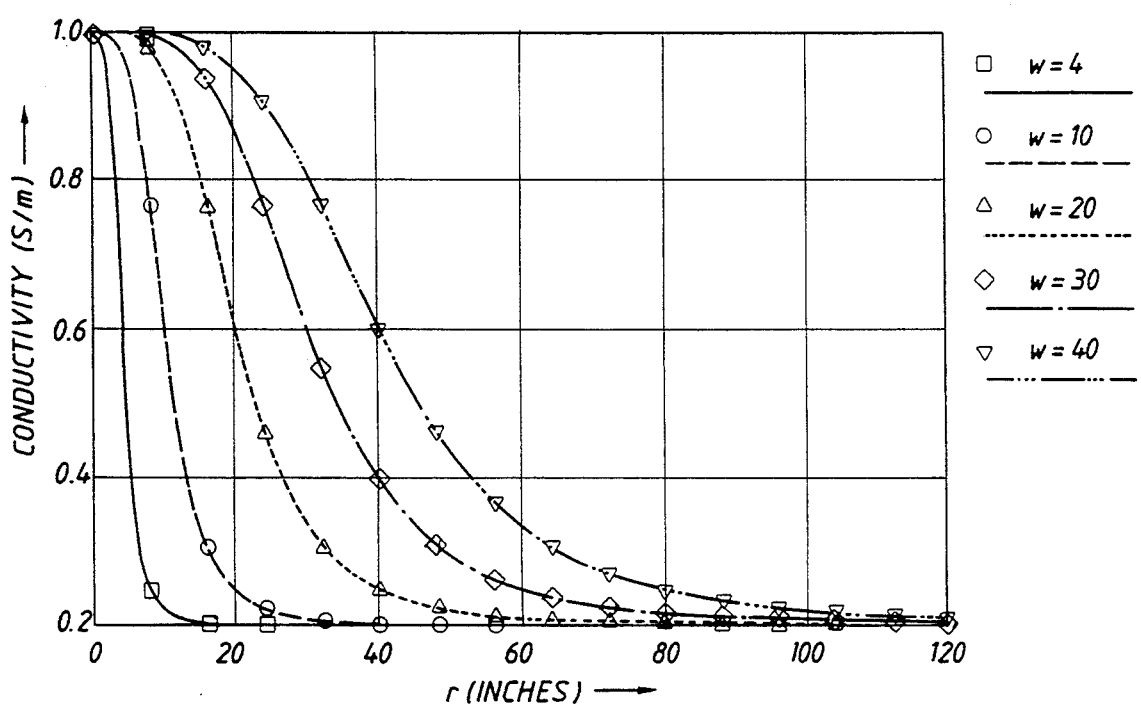
FIG. 14 illustrates four parameter maximally flat profiles for N=4.
Figure 15:
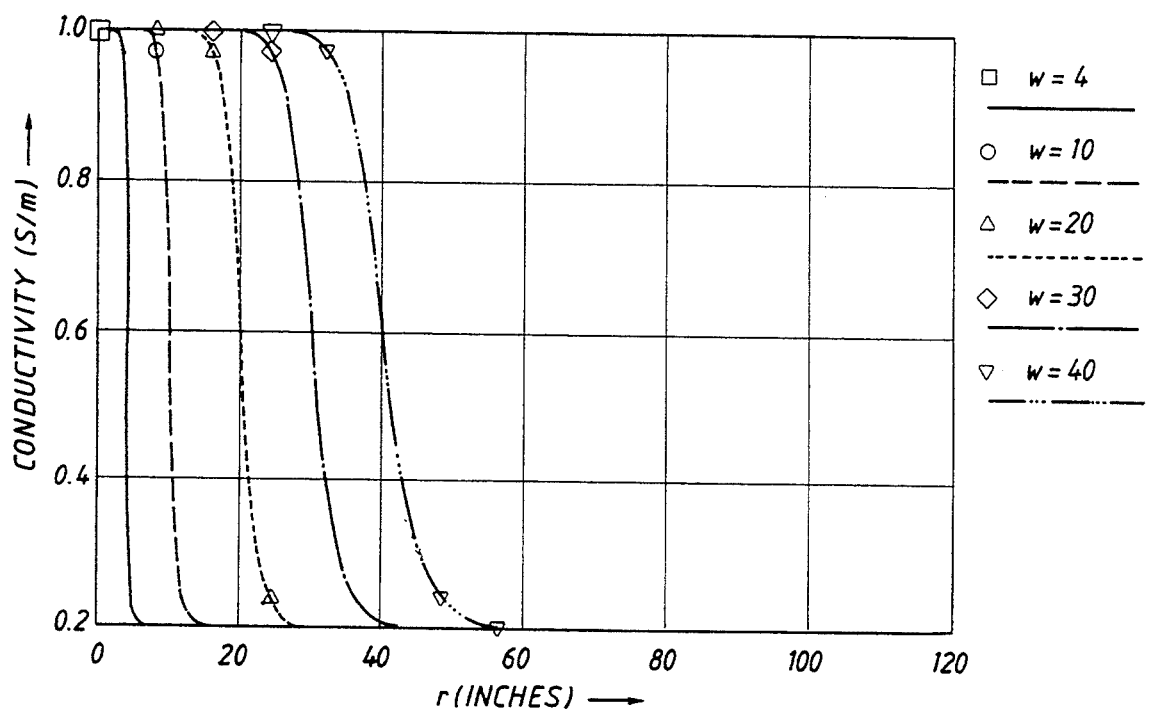
FIG. 15 illustrates four parameter maximally flat, profiles for N=16.

The profile $\sigma_4(\rho)$ has four parameters. In the original filter design application the order of the filter N is required to be a positive integer in order to have a passive realization. Here it is only necessary for N to be positive. Notice the distance $\omega$ is the halfway point of the transition between $\sigma_{xo}$ and $\sigma_t$. Some example of the Butterworth profile are given in FIGS. 13, 14 and 15. Note that the profiles are maximally flat in the flushed zone and in the limit of large N go over continuously to the traditional three parameter $\sigma_{xo}$, $\sigma_t$, $D_i$ profile upon which the tornado chart interpretation is based. For interpretation based on a simple characterization of the transition zone, two derived distances $r_1$ and $r_2$ define respectively the end of the flushed zone and the beginning of the non-invaded zone.

$$r_1 = \omega(1 - 2/N),$$

$$r_2 = \omega(1 + 2/N). \tag{25}$$

Radii $r_1$ and $r_2$ are defined as the intersections of straight lines associated with respectively the inner and outer horizontal asymptotes, and the line passing through the midpoint $(\omega, (\sigma_t - \sigma_{xo})/2)$ and tangent to the profile at the same point. The order parameter N, which is proportional to the slope of the transition, and the midpoint transition radius $\omega$ are non-linear parameters, while the asymptotes $\sigma_{xo}$ and $\sigma_t$ are linear parameters of the maximal flat model.

The parametric profile can easily be extended to allow for an annulus. As an example, a six parameter profile $\sigma_6(\rho)$ with three conductivity parameters $\sigma_{xo}$, $\sigma_{an}$, $\sigma_t$, two transition radii $\omega_1$, $\omega_2$ (where $0<\omega_1<\omega_2$), and one slope parameter N is $$\sigma_6(\rho)=\sigma_t+(\sigma_{xo}-\sigma_{an})f(\rho,\omega_1,N)+(\sigma_{an}-\sigma_t)f(\rho,\omega_2,N), \quad (26)$$

where $f(\rho,\omega,N)=1/[1+(\rho/\omega)^N]$.

The limit of large N is an important limiting case which allows the identification of the significance of the three conductivities appearing in eqn. (26). Then eqn. (26) reduces to a rectangular step profile, i.e.

$$\lim_{N\to\infty} \sigma_6(\rho) = \begin{cases} \sigma_{xo}, & \text{if } 0 \leq \rho \leq w_1; \\ \sigma_{an}, & \text{if } w_1 \leq \rho \leq w_2; \\ \sigma_t, & \text{if } \rho \geq w_2. \end{cases} \quad (27)$$

Figure 16:
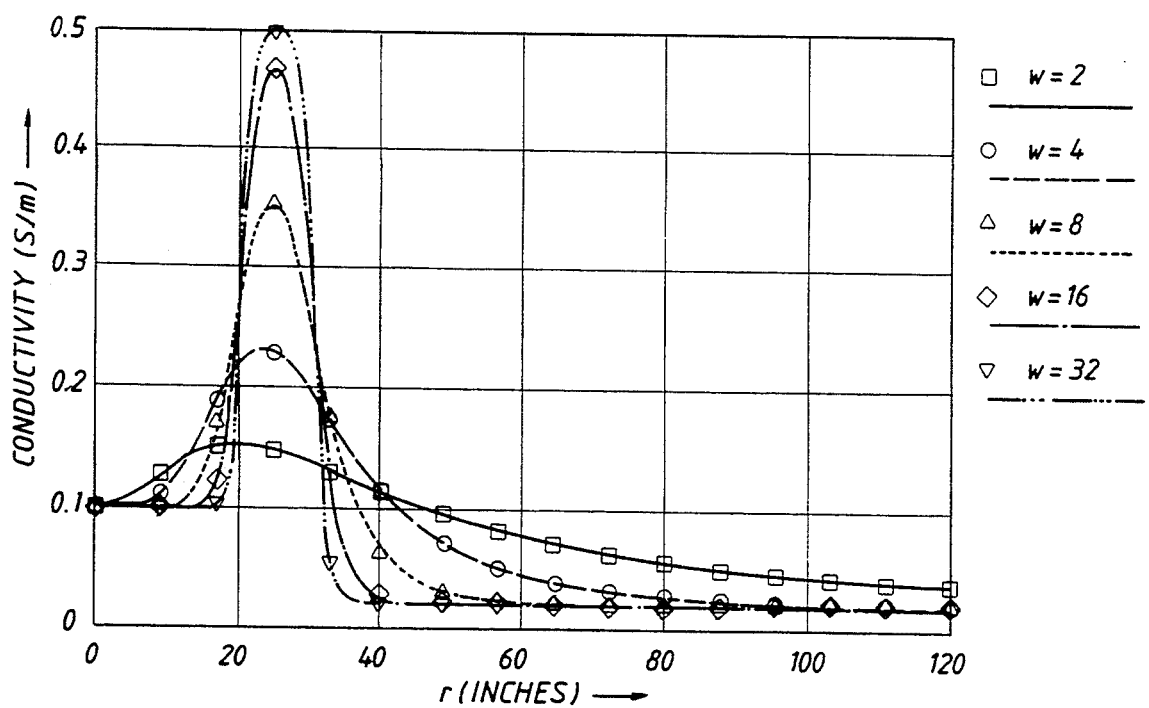

An example $\sigma_6(\rho)$ profile with $\omega_1=20$ and $\omega_2=30$ is given in FIG. 16 for several values of N as indicated in the legend. The profiles given by eqns. (24) and (26) are thus simply extendible to any number of radial regions. The fundamental limitation is the ability of induction data to resolve more than perhaps six parameters. This limitation will become more evident in the next section.

4. Nonlinear Parameter Estimation

As shown in section 4, the parametric conductivity profile model is nonlinear in the transition radius $\omega$ and the order N. Thus a nonlinear estimation method is required. The method of choice, resulting from working with several methods, is a modified Levenberg-Marquardt (LM) algorithm adapted from Numerical Recipes [12]. The idea is to match the apparent conductivity log data $\sigma_{ai}$ with maximally flat model based estimates $\hat{\sigma}_{ai}(m)$ (see eqn. (22)) for the $i=1,2,\ldots,M_c$, by adjusting the formation conductivity profile. The hat notation of statistical estimation theory denotes an estimate. The argument m of the estimate is the estimated model vector whose components in the case of a four parameter profile are explicitly given by $$m_1=\sigma_{xo},$$

$$m_2=\sigma_t,$$

$$m_3=\omega,$$

$$m_4=N. \quad (28)$$

It is important to notice that formally, the method does not depend upon the specific number of measurements $M_c$ or model parameters $N_p$. Of course, how well the method performs does depend on $M_c$ and $N_p$. The model parameters enter through the radial pixel estimates $\sigma_m$ of the formation conductivity. From eqn. (23), the relation is $$\hat{\sigma}_{ai}(m) = \sum_{m=0}^{N_c} w_{im}(\sigma_0)\sigma_m, \quad (29)$$

where $$\sigma_m = \sigma_{N_p}(\rho_m).$$

In eqn. (29), $\sigma_{N_p}(\rho)$ is an $N_p$ parameter maximally flat profile such as eqns. (24) or (26), and $\rho_m$ is a member of the discretization of the $\rho$ axis as defined between eqns. (12) and (13). In the usual application of the LM algorithm, and in terms of these definitions. the model vector m is determined to be the vector which minimizes the $X^2$ fit to the data. The definition is $$\chi^2(m) = \sum_{i=1}^{M_c} |(\sigma_{ai} - \hat{\sigma}_{ai}(m))/\sigma_i|^2, \quad (30)$$

where $\sigma_{ai}$ is the $i^{th}$ input median apparent conductivity data channel. The conductivity $\sigma_i$ is the associated standard deviation of the $i^{th}$ data channel and is an a-priori estimate of the reliability of the data; alternatively $\sigma_i$ can represent the ability of the underlying model for the radial conductivity profile to fit the actual profile.

The method requires knowledge of the gradient (first derivative), and the second partial derivative matrix (Hessian matrix) of $X^2(m)$ with respect to the model vector m. The concept is to approximate $X^2(m)$ by a quadratic surface in the model parameters $m_k$ $$X^2(m)=\gamma-\beta.m+\tfrac{1}{2}m.H.m+\ldots, \quad (31)$$

A necessary condition for the minimum $m=m_3$ of $X^2(m)$ is that the gradient with respect to the model parameters be zero:

$$\nabla X^2(m)=0, \quad (32)$$

which from eqn. (31) yields the condition $$H.m_3=\beta. \quad (33)$$

An iterative equation for the minimum is found by setting the gradient of eqn. (31) to zero, and then substituting $\beta$ from eqn. (33) into the result to obtain the iterative solution $$m_{new}=m_{old}+H^{-1}(-\nabla X^2(m_{old})). \quad (34)$$

As it stands, eqn. (34) is not suitable. Near the minimum it has quadratic convergence, but may fail to find the minimum unless the initial estimate is close enough. In addition, the Hessian matrix H can be singular or ill conditioned. The LM algorithm cleverly overcomes these deficiencies by adding a numerical parameter $\lambda$ which improves the conditioning problem. At the same time it also enables the iterative procedure to alternate between a gradient search when the current model estimate m is far from the minimum, and therefore approximation (31) is not applicable, and a quadratic convergence solution approaching eqn. (34) near the minimum. The LM algorithm iteratively solves the modified system $$m_{new}=m_{old}+L^{-1}(-\nabla X^2(m_{old})), \quad (35)$$

where $$L_{nm}=(1+\lambda\sigma_{nm})H_{nm}, \quad (36)$$

and where $\sigma_{nm}$ is the Kronecker delta which is one if $n=m$ and zero otherwise. When $\lambda$ is small, eqn. (36) reverts to eqn. (35) which is appropriate near the minimum. However when $\lambda$ is large, the matrix L and its inverse become diagonal. In this limit, eqn. (35) becomes a gradient method which chooses a new estimate model vector $m_{new}$ to be downhill from the previous estimate $m_{old}$. The algorithm contains a loop which solves eqn. (35). After each iteration $X^2(m_{new})$ is compared with $X^2(m_{old})$. If it is smaller, $\lambda$ is decreased by a factor of 10, otherwise it increases $\lambda$ by a factor of 10. Then $m_{old}$ is set equal to $m_{new}$, and iteration continues until convergence is achieved.

A more explicit form of eqn. (34) is found by computing the gradient and Hessian from eqn. (30). The results are $$-(\nabla \chi^2(m))_k = 2 \sum_{i=1}^{M_c} \frac{(\sigma_{ai} - \sigma_{ai}(m))}{\sigma_i^2} \frac{\partial \sigma_{ai}(m)}{\partial m_k}, \quad (37)$$

$$\equiv 2\beta_k,$$

$$\frac{\partial^2 \chi^2(m)}{\partial m_k \partial m_l} = 2 \sum_{i=1}^{M_c} \frac{((\sigma_{ai} - \sigma_{ai}(m))}{\sigma_i^2} \frac{\partial^2 \sigma_{ai}(m)}{\partial m_k \partial m_l} -$$

$$2 \sum_{i=1}^{M_c} \frac{1}{\sigma_i^2} \frac{\partial \sigma_{ai}(m)}{\partial m_k} \frac{\partial \sigma_{ai}(m)}{\partial m_l},$$

$$\equiv 2H_{kl}.$$

Define the change in the model vector as $$\delta m = m_{new} - m_{old}. \quad (38)$$

Then the matrix eqn. (35) has the more explicit form $$\sum_{i=1}^{N_P} L_{kl} \delta m_l = \beta_k. \quad (39)$$

The induction measurement is not sensitive to the shape of the formation conductivity profile controlled by model parameter N, for deep invasion ($\omega > 30$ in) as can be determined by examining the response functions defined by eqn. (5). Then too in tight rock formations, the radial profile can be featureless. In such cases, which often occur, matrix eqn. (39) is poorly conditioned and sometimes singular. In least square estimation methods, the system matrix is often modified to improve its condition by adding a constraint matrix such as minimum energy or curvature. The book by Twomey [13] has several examples showing the solution enhancement possible by conditioning. Of course if the system is linear, the optimum least square method with minimum norm solution is obtained by singular value decomposition.

In the case of linear systems, one can show that certain classes of constraint [13] yield a unique solution to the model vector m. In the case of minimum energy, a proof of uniqueness is given in [14]. The uniqueness occurs because the conditioned system matrix can be shown to be non-singular. A further benefit of conditioned methods is that one can impose additional physical constraints on the model vector m which corresponds to knowledge on the possible class of solution which otherwise could not be imposed. The LM problem is nonlinear, and has a special $X^2$ structure, so dynamically constrained LM (DCLM), is an extension of the method. For the induction problem, a simple but effective constraint modification of LM results from appending a dummy data channel to the $X^2$ variable, i.e.

$$X^2(m) = X_0^2(m) + C(m), \quad (40)$$

where the constraint C(m) is chosen to be a simple quadratic form in the model parameters $$C(m) = ((\sigma_a N_{c+1} - \sigma_a N_{c+1}(m))/\sigma_{N_{c+1}})^2, \quad (41)$$

where $$C(m) = |(\sigma_a N_{c+1} - \sigma_a N_{c+1}(m))/\sigma_{N_{c+1}}|^2, \quad (41)$$

where $$\sigma_a N_{c+1}(m) = \sum_{k=1}^{N_P} ((m_k - m_{0k})/\sigma_{mk})^2,$$

$$\sigma_a N_{c+1} = 0.$$

The constraint tends to keep the four parameters (see eqn. (28)) in reasonable ranges $$-\sigma_{mk} + m_{0k} < m_k < \sigma_{mk} + m_{0k}, \quad (42)$$

for k=1,2, ..., $N_p$. An important additional hard constraint for this profile estimation problem is that all parameters $m_k$ are positive. Since the LM method is nonlinear, positivity is guaranteed by the change of model variables $$m_k = q_k^2, \quad (43)$$

which modifies matrix eqn. (39). It becomes $$\sum_{i=1}^{N_P} L'_{kl} \delta q_l = \beta'_k, \quad (44)$$

where $$L'_{kl} = 4q_k q_l (1 + \delta_{kl} H_{kl}),$$

$$\beta'_k = 2q_k \beta_k,$$

and where $H_{kl}$ and $\beta_k$ are given by eqn. (37). The relative emphasis of the solution on the constraint C(m) is determined by $\sigma_a N_{c+1}$. It is not possible to predict (within an order of magnitude) the model data fit $X_0^2(m)$ achieved on an arbitrary input data set. This observation motivates the dynamic adjustment of $\sigma_a N_{c+1}$. The dynamic adjustment of the constraint weight compensates for possible dynamic range of the curve data $\sigma_{ai}$, i=1,2, ..., $M_c$ which typically varies over four orders of magnitude. The DCLM algorithm also deals with cases where the model may not fit the data, and smoothly tracks a minimum $X^2$ solution into poorly conditioned parameter regimes.

Dynamic conditioning results choosing $\sigma N_{c+1}$ such that the relative weight of the constraint $\sigma_a N_{c+1}$ to model data fit $X_0^2(m)$ ratio is kept at a constant value Y $$C(m)/X_0^2(m) = Y. \quad (45)$$

The iteration path which DCLM takes to the minimum $X^2$ solution can go through regions of large condition number $c_N$ of the matrix $L'_{kl}$ defined by eqn. (44). In general too, the problem is ill-conditioned so that the choice of matrix algorithm for solving eqn. (44) is critical. For this reason DCLM uses Linpack [15] double precision symmetric indefinite factorization DSICO and solver DSISL (which also report the condition number).

In summary, the new DCLM algorithm iteration scheme is: i) initialize parameter vector m, ii) solve eqn. (44) for the new model parameters $m_{new}$, iii) determine the relative constraint weighting numerical parameter $\sigma_a N_{c+1}$ by eqn. (45). (In the numerical results to follow, the ratio parameter Y is chosen to be ¼), and iv) check results to determine if the solution has converged; if not, repeat the iteration.

5. Numerical Results

Several invasion profile cases in thick beds are shown in FIGS. 17 through 24. In each of these the upper half of the figures is the result plotted in log resistivity ($\log_{10}(R)$), where $R=1/\sigma$ is in Ohm m, and the same result in the lower half of the figure plotted linearly in conductivity $\sigma$ in mS/m. The abscissa is the radial coordinate $\rho$ between the borehole radius and 120 inches. In comparing the two equivalent representations, it is important to realize that conductivity is actually computed and more closely reflects the sensitivity of the measurement.

The four distinct open dots are the 10, 20, 30, and 60 inch median curve input values. The dotted line is the input profile, the dashed line is initial estimate which is simply a four parameter curve fit to the four median points, and the solid line is the DCLM estimate. These figures also give in table form the four parameters from eqn. (28), and both the input and estimated values of the two characteristic radii $r_1$ and $r_2$ defined by eqn. (25), $\sigma_{xo}$, and $\sigma_t$. In addition, the data $X_0^2$ fit and condition number $C_N$ of the DCLM matrix L' of eqn. (44), are also in the figure captions. Quality indicators of the solution are small condition numbers, less than perhaps $10^4$ indicating numerical reliability, and data fit $X_0^2$ from eqn. (40) less than perhaps 10, corresponding to the estimated model fitting the data.

In several instances. FIGS. 17 through 24 show that the median curves, while indicative of the shape of the profile. are not necessarily quantitatively correct. This is because they are not point estimates, but rather center weighted averages as their descriptor median suggests. Schemes that do little more than curve fit to the median curves, (as does the displayed dashed curve used for initializing DCLM) therefore often have unacceptably large error.

An application of the shape of the invasion profile obtained with DCLM, which uses $r_1$, $r_2$, $\sigma_{xo}$, and $\sigma_t$, is to estimate the volume of mud flitrate per unit depth which has displaced the connate fluids.

FIG. 25 is a three-dimensional perspective of a simulated log through a finitely thick 20 ft. bed with conductive invasion. The simulated data is computed by the semianalytic method [17]. The exact, and estimated typical values for $\sigma_t$, $\sigma_{xo}$, $r_1$, and $r_2$, are also included in table form for each of the three beds.

Notice that in many of the shallow invasion results, the accuracy of the $\sigma_t$ estimate is better than $\sigma_{xo}$. The method is designed to have better $\sigma_t$ accuracy because the maximally flat parameter model improves the sensitivity of the measurement to $\sigma_t$. The relatively less accurate $\sigma_{xo}$ for shallow invasion cases is related to the radial response functions which are small near the borehole as can been seen from FIG. 12. Because of this, improved shallow radial profiling results can be obtained by including a shallow focused micro resistivity device in the suite of measurements such as the MicroSFL tool [18]. This is a planned and relatively straightforward extension for the DCLM parameter estimation method.

No inversion study is complete without characterization of noise amplification. This is particularly true when the processing is nonlinear, and the linear steps in the iterations can have large condition numbers. Noise is added to the four input curves in the following way. Noise of 10, 5, 2, and 1 mS/m standard deviation is added to the 10, 20, 30 and 60 in. curves. The noise is computed by a Box-Muller transformation of uniformly distributed white noise. This transformation produces normally distributed random noise (see [12], pp. 195–203). A large number $N_n$ of such noise samples are added to the four input curves, and the $N_n$ resulting sets of parameters are saved. Sample statistical estimates of the resulting standard deviations for each of the four parameters are computed. The results of this statistical noise study for each of the examples in FIGS. 17 through 24 are summarized in Table 1. Each entry consists of the sample standard deviation estimate, and in parenthesis to the immediate right is the ratio of the sample standard deviation estimate to actual value in percent. Table 1 supports the conclusion that the inversion is quite robust for $\sigma_t$ and $\omega$. As to be expected, the statistical variation of the shape parameter N and $\sigma_{xo}$ are larger. $N_n$ is 100.

Figure 17:
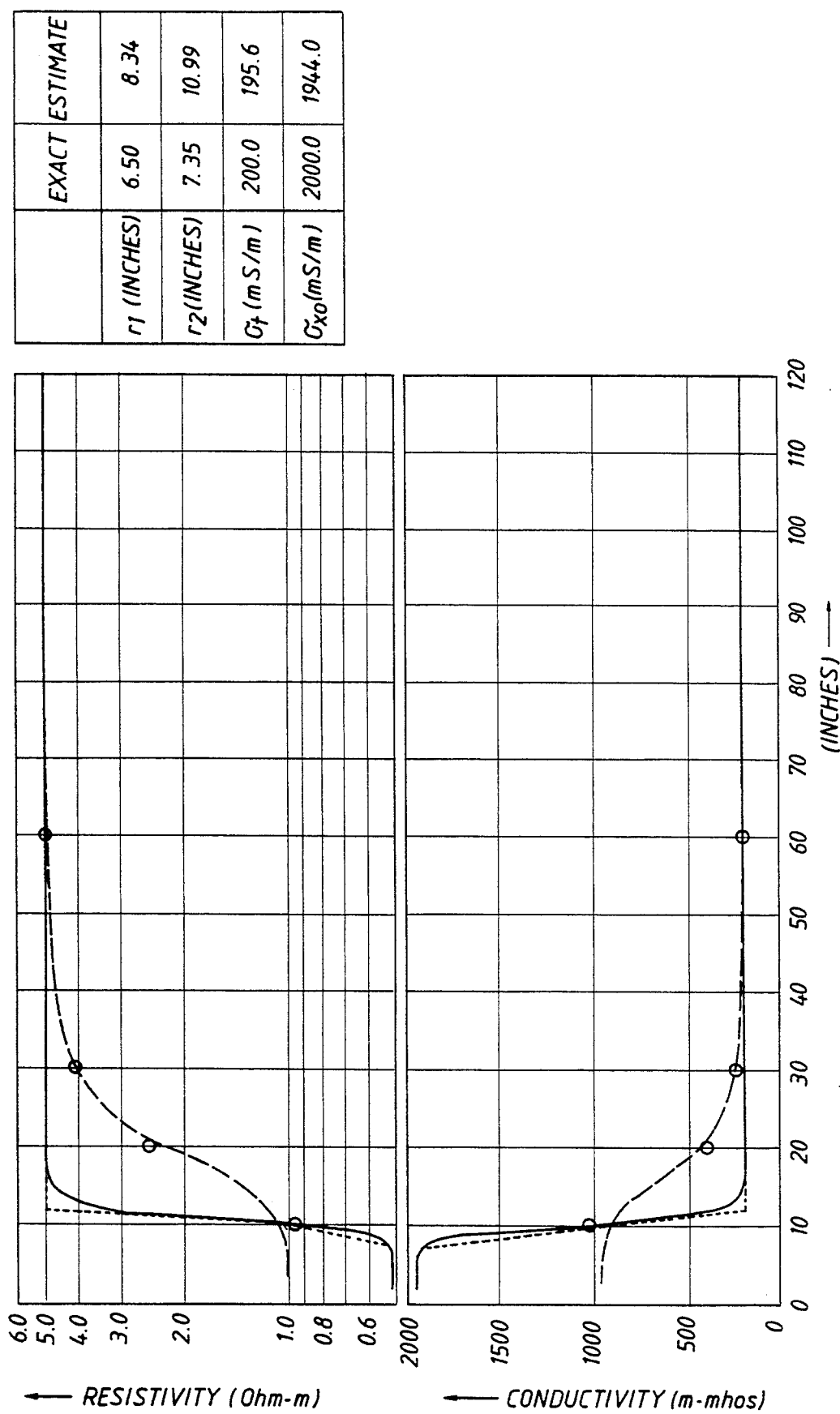
FIG. 17 illustrates thick bed simulation where large dots are median curves, dotted line as exact formation, dashed line as initial estimate, and solid lane is DCLM estimate for different values of chi-squared, $C_n$, N and w.
Figure 18:
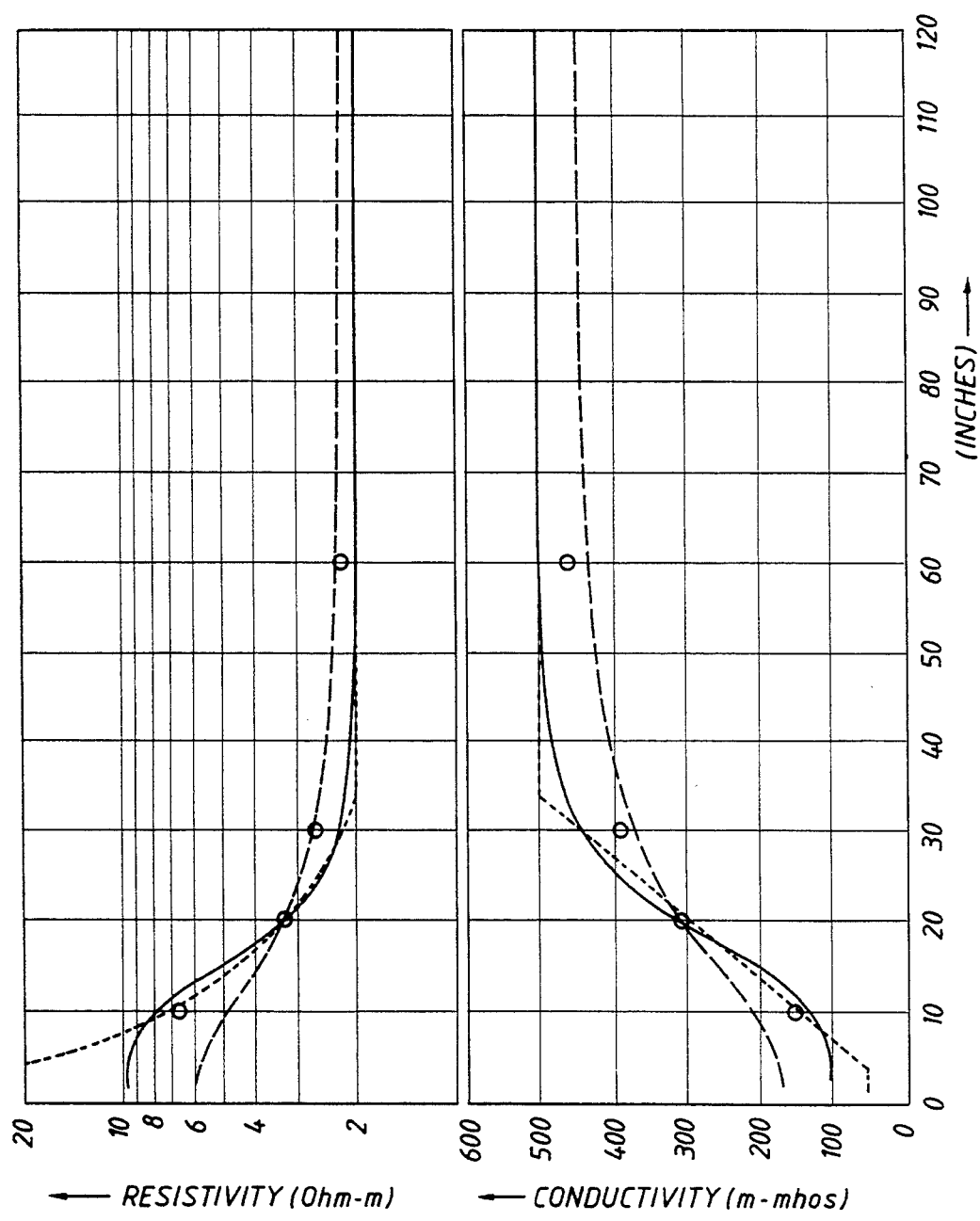
FIG. 18 illustrates thick bed simulation where large dots are median curves, dotted line as exact formation, dashed line is initial estimate, and solid line is DCLM estimate for different values of chi-squared, $C_n$, N and w.
Figure 19:
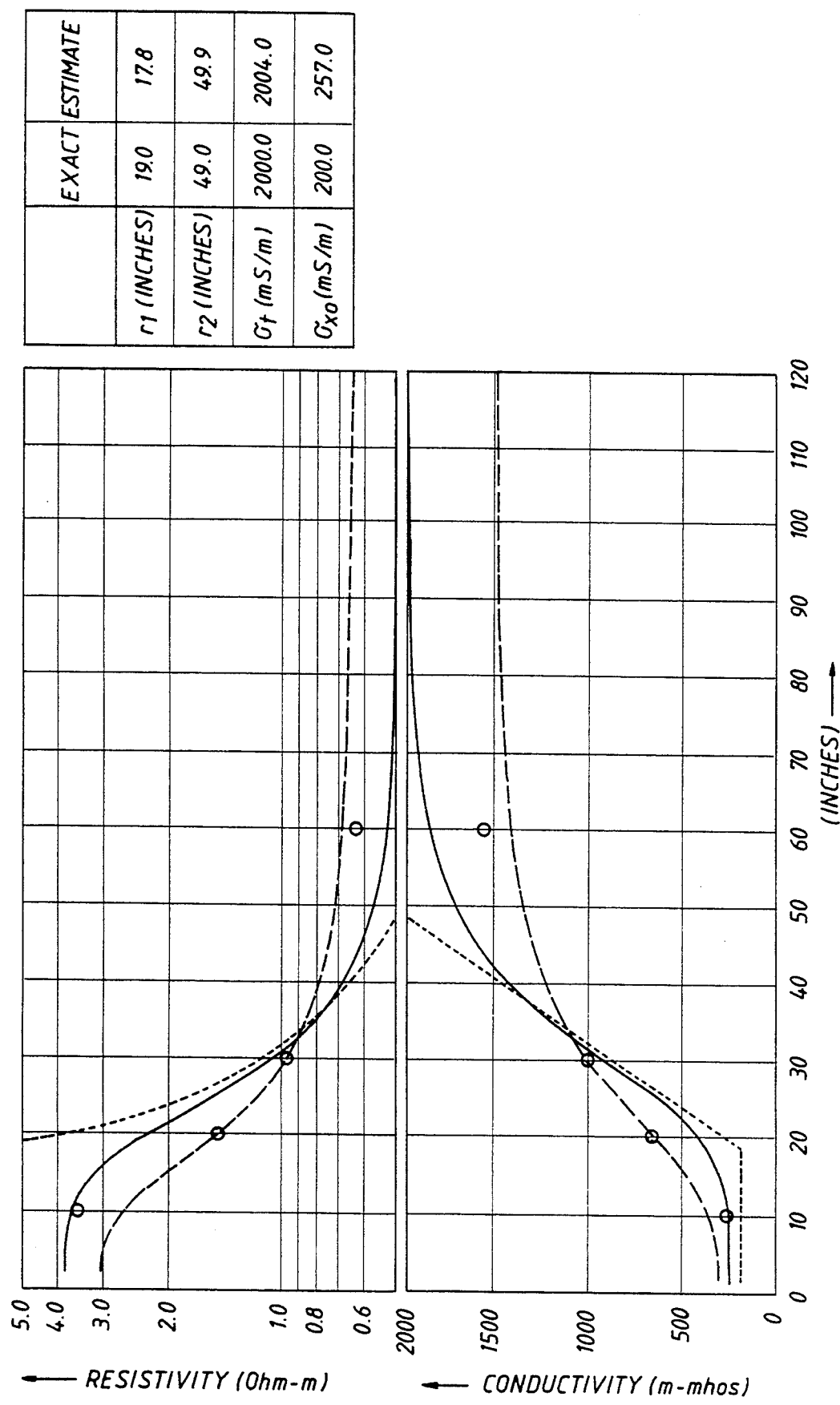
FIG. 19 illustrates thick bed simulation where large dots are median curves, dotted line is exact formation, dashed line is initial estimate, and solid line is DCLM estimate for different values of chi-squared, $C_n$, N and w.
Figure 20:
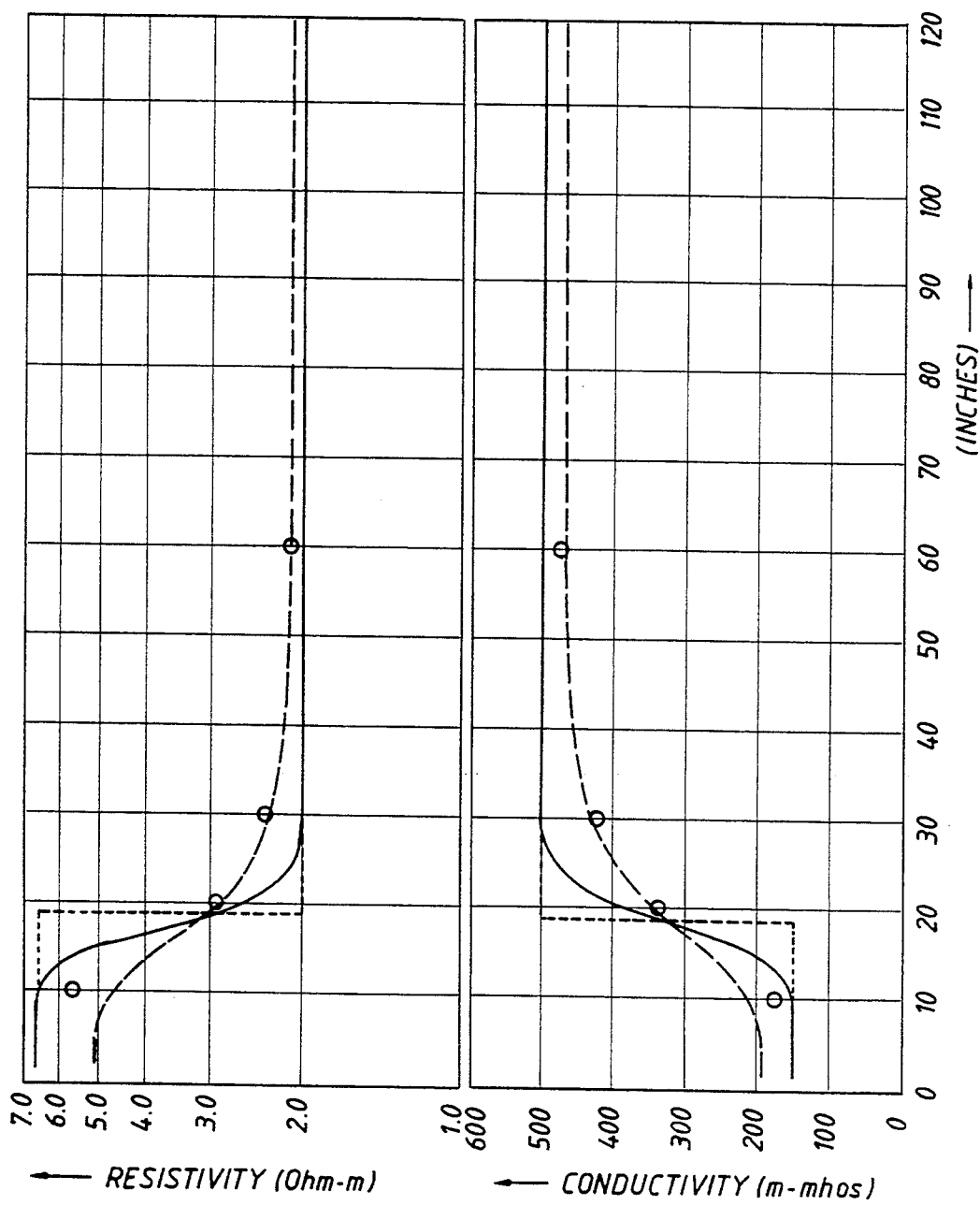
FIG. 20 illustrates thick bed simulation where large dots are median curves, dotted line is exact formation, dashed lane is initial estimate, and solid line is DCLM estimate for different values of chi-squared, $C_n$, N and w.
Figure 21:
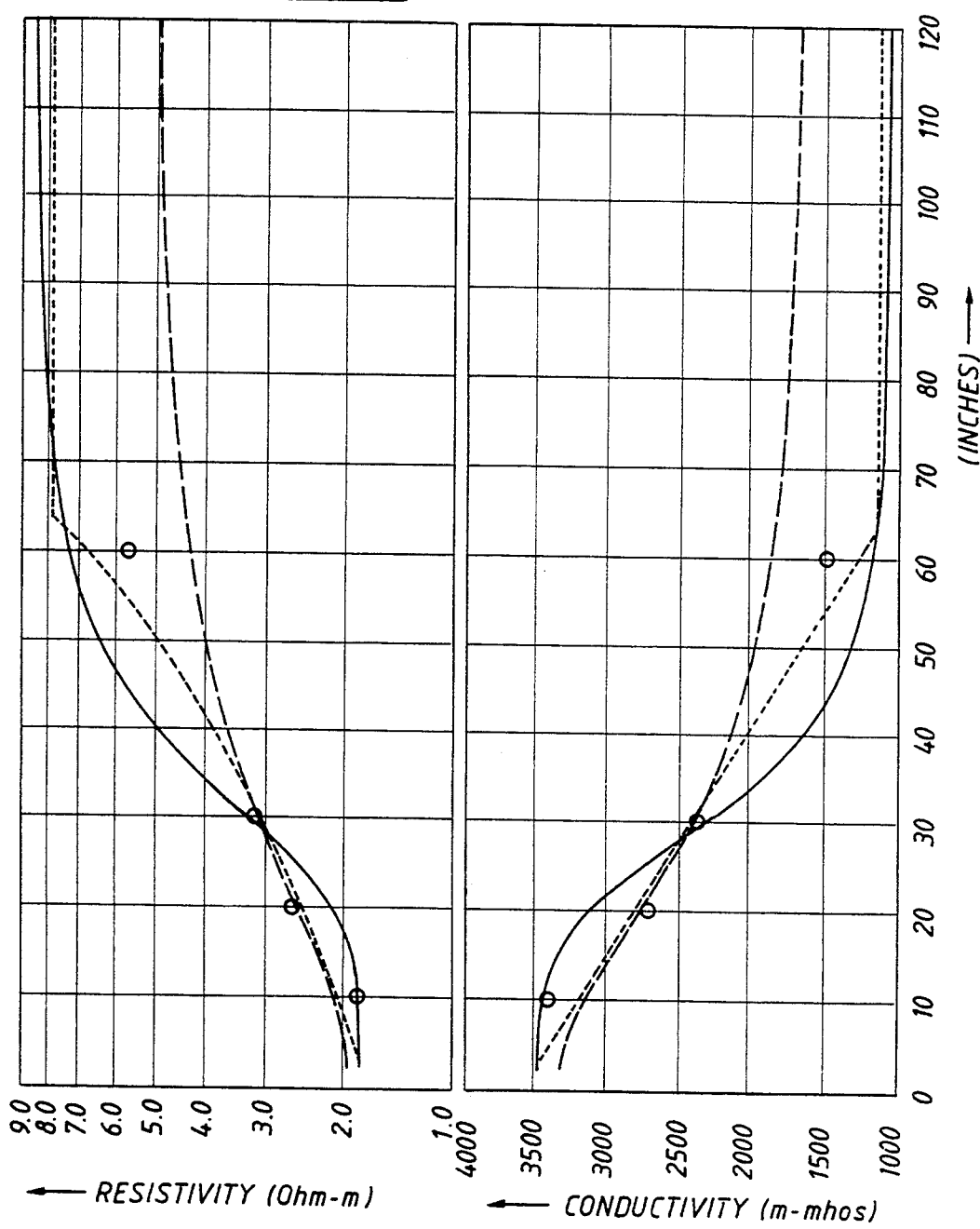
FIG. 21 illustrates thick bed simulation where large dots are median curves, dotted line as exact formation, dashed line is initial estimate, and solid line is DCLM estimate for different values of chi-squared, $C_n$, N and w.
Figure 22:
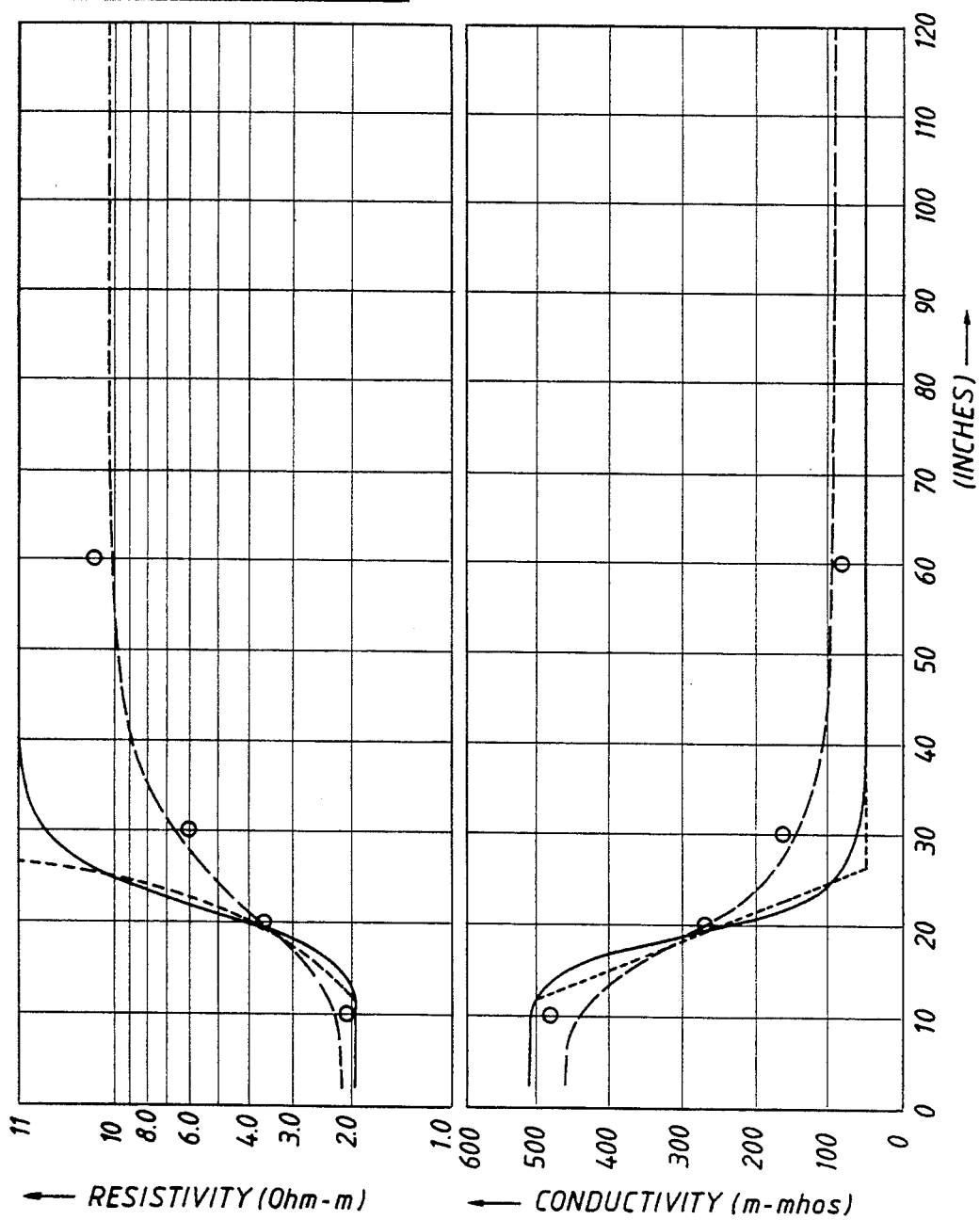
FIG. 22 illustrates thick bed simulation where large dots are median curves, dotted line is exact formation, dashed line is initial estimate, and solid line is DCLM estimate for different values of chi-squared, $C_n$, N and w.
Figure 23:
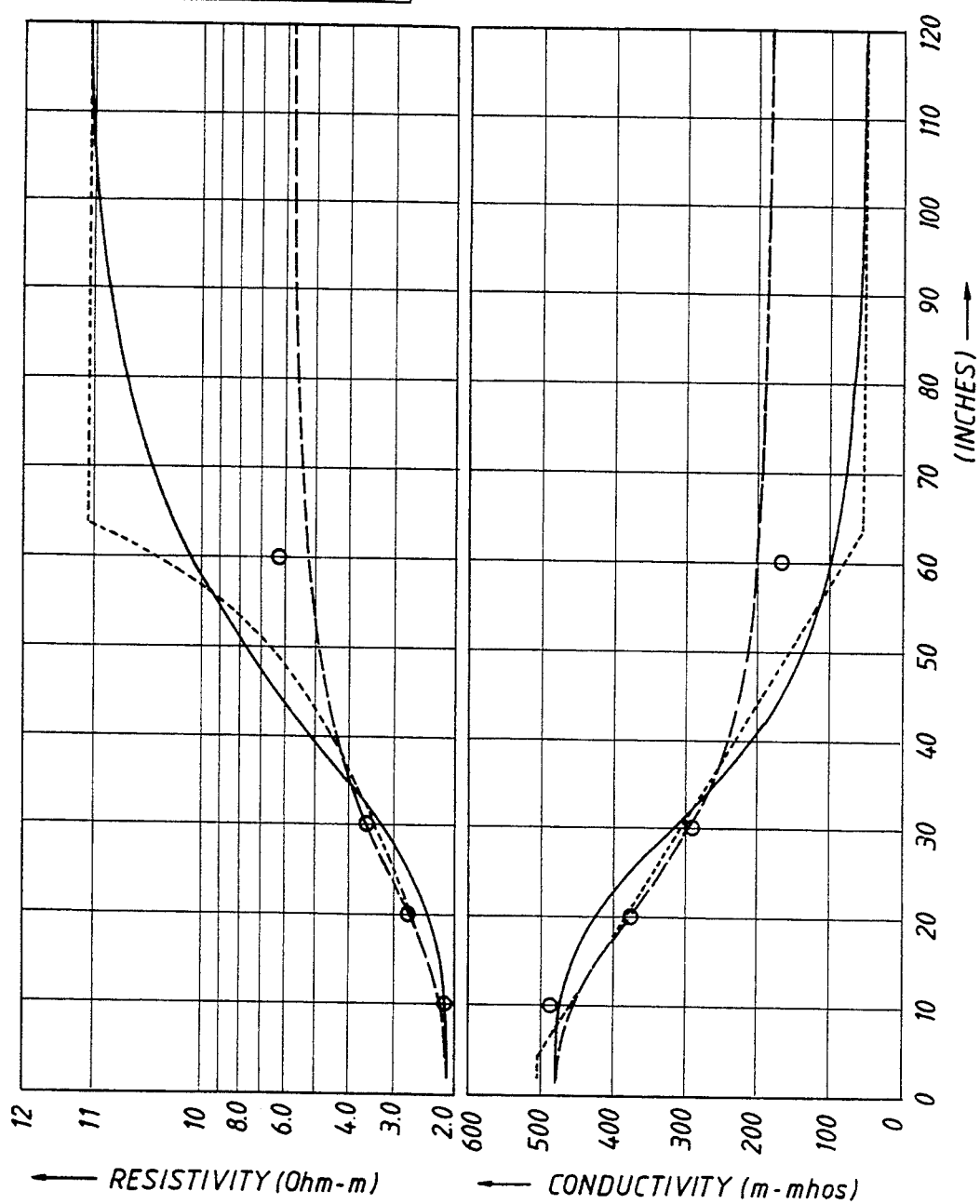
FIG. 23 illustrates thick bed simulation where large dots are median curves, dotted line is exact formation, dashed line is initial estimate, and solid line is DCLM estimate for different values of chi-squared, $C_n$, N and w.
Figure 24:
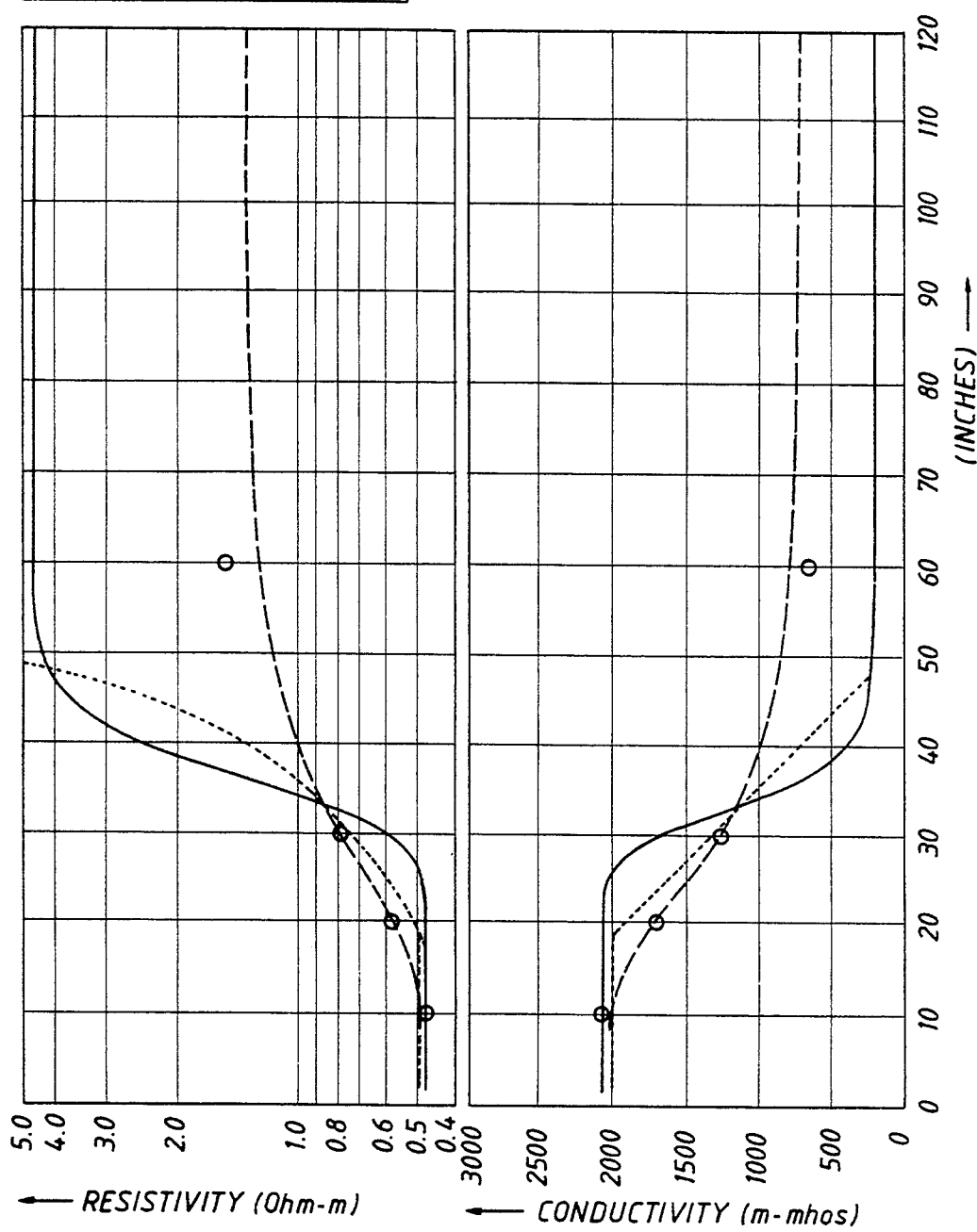
FIG. 24 illustrates thick bed simulation where large dots are median curves, dotted line is exact formation, dashed line is initial estimate, and solid line is DCLM estimate for different values of chi-squared, $C_n$, N and w.

|  | $\sigma_{\sigma xo}$ (mS/m) | $\sigma_{\sigma t}$ (mS/m) | $\sigma_w$ (in) | $\sigma_N$ (unitless) |
| --- | --- | --- | --- | --- |
| FIG. 17 | 56. (3.) | 3. (1.) | 0.18 (2.) | 2.3 (8.) |
| FIG. 18 | 5. (10) | 2. (.4) | 0.17 (1.) | 0.6 (14) |
| FIG. 19 | 10. (5.) | 4. (.2) | 0.21 (.6) | 0.02 (1.) |
| FIG. 20 | 11. (8.) | 0.2 (0.) | 0.08 (.4) | 1.2 (10) |
| FIG. 21 | 58. (2.) | 140. (12) | 1.2 (4.) | 2.4 (30) |
| FIG. 22 | 3. (.6) | 1.6 (3.) | 0.18 (.9) | 6.1 (60) |
| FIG. 23 | 10. (2.) | 6.7 (14) | 1.1 (3.) | 0.5 (14) |
| FIG. 24 | 10. (.5) | 1.8 (.9) | 0.13 (.4) | 0.8 (27) |

Figure 26:
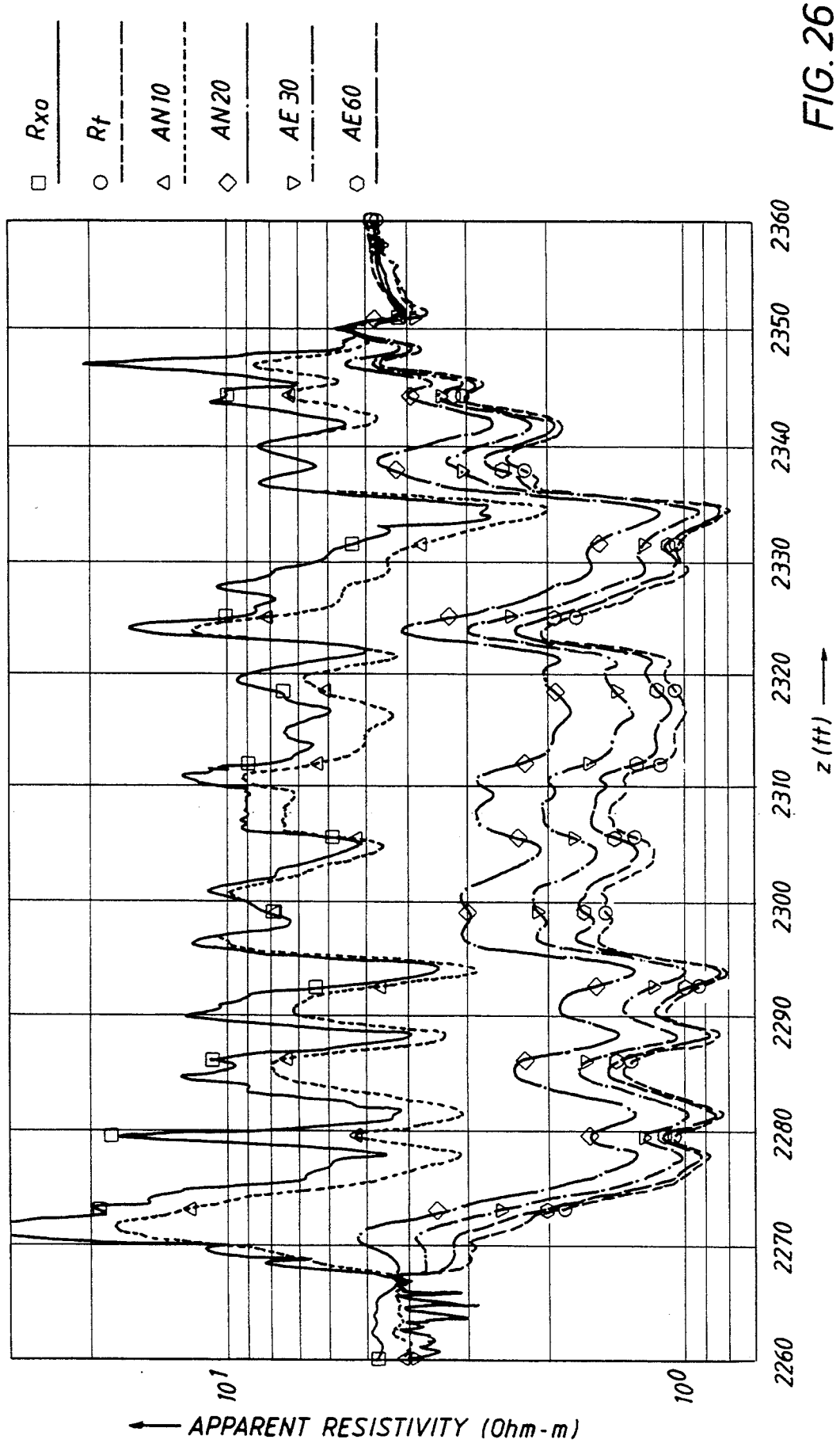
FIG. 26 illustrates a field log example of resistive invasion.

FIGS. 17 through 25 are benchmarks and indicate the accuracy of DCLM in known environments. FIG. 26 is an 100 ft. example of field log recorded with the AIT. Each end of the interval is shale and the center bed is an invaded sand water zone. Note that the DCLM estimated $\sigma_t$ follows the character of the 60 in. curve but is more conductive. Similarly the less reliable $\sigma_{xo}$ estimate follows the 10 in. curve, but is more resistive and shows greater departure. In most of this interval the estimated apparent conductivity curves $\sigma_{ai}(m)$ fit the data $\sigma_{ai}$ to five significant figures, and at the same time have condition numbers $C_N$ less than $10^3$. This increases the confidence of the results. Some artifacts of spiking are on the $\sigma_{xo}$ curve in the interval 2260–2267. These are caused by irregular borehole as determined from the caliper log which renders the 10 in. median curve noisy and unreliable. This in turn causes DCLM to predict fictitious shallow step like invasion corresponding to small $\omega$ and large N.

6. References

5. Hunka, J. F., et al, 1990, "A new Resistivity Measurement System for Deep Formation Imaging and High Resolution Formation Evaluation", proceedings of the 6th Annual Technical Conference of the Society of Petroleum Engineers, New Orleans, La., pp 295–307.

8. Wait, J. R., 1984, "General Formulation of the Induction Logging Problem for Concentric Layers about the Borehole", Special Issue on Electromagnetic Methods in Applied Geophysics, IEEE Transactionf on Geoscience and Remote Sensing, Vol GE-22, no. 1, pp. 34–42.

9. Tittman, J., 1986, "Geophysical Well Logging" excerpted from Methods of Experimental Physics, Academic Press, Inc, Orlando, Fla., pp. 88–90.

11. Oppenheim, A. V., and R. W. Schafer, 1975, "Digital Signal Processing", Prentice-Hall, Inc, Englewood Cliffs, N.J., pp. 219–220.

12. Press, W. H., B. P. Flannery, S. A. Teukolsky and W. T. Vetterling, 1986, "Numerical Recipes", Cambridge University, Press, Cambridge, U.K., pp. 521–528.

13. Twomey, S., 1977, "Introduction to the Mathematics of Inversion in Remote Sensing and Indirect Measurements", Elsevier Scientific Publishing Company, Amsterdam, Chapter 6.

14. Howard, A. Q., Jr., C. E. Glass, D. B. Henry, D. M. N'Guessan and D. M. Siemers, 1983, "Wave Diffusion Tomography" Report to the U.S. Nuclear Regulatory Commission, NUREG/CR-3143 Vol. 4, Department of Mining and Geological Engineering, University of Arizona, Tucson, Ariz., 113 pages.

15. Dongarra, J. J., 1979, et al, LINPACK User's Guide, SIAM, Philadelphia.

17. Chew, W. C., S. Barone, B. Anderson and C. Hennessy, 1984, "Diffraction of Axisymmetric Waves in a Borehole by Bed Boundary Discontinuities", Geophysics, vol 53, pp. 1577–1586.

18. Log Interpretation Principles/Applications, 1987, 2nd Edition, Schlumberger Educational Services, 1131 Lamar Suite 1175, Houston, Tex. 77010, pp 89–90.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A system responsive to output signals from a wellbore tool adapted to be disposed in a wellbore for plotting a log on an output record medium, comprising:

first means responsive to said output signals from said wellbore tool for generating a plurality of sets of invasion parameters corresponding, respectively, to a plurality of different depths in said wellbore, each of said sets of invasion parameters including a first parameter associated with a flushed zone in a formation traversed by said wellbore, second parameters associated with a transition zone in said formation, and a third parameter associated with an uninvaded zone in said formation, said second parameters including a first value indicative of a midpoint of said transition zone between said flushed zone and said uninvaded zone and a second value related to a slope of a radial profile in said transition zone between said flushed zone and said uninvaded zone;

second means responsive to said plurality of sets of invasion parameters generated by said first means for determining a plurality of radial profiles in said formation traversed by said wellbore associated, respectively, with said plurality of different depths in said wellbore; and third means for plotting said plurality of radial profiles representing said log on said output record medium, each of the radial profiles including said flushed zone determined by said first parameter, said transition zone determined by said second parameters, and said uninvaded zone determined by said third parameter.

2. The system of claim 1, wherein said first means comprises:

selection means for selecting a plurality of initial estimates of said set of invasion parameters, said plurality of initial estimates including a first initial estimate and subsequent initial estimates of said set of invasion parameters;

cost function determination means responsive to said plurality of initial estimates of said invasion parameters selected by said selection means for determining a plurality of cost functions corresponding, respectively, to said plurality of initial estimates; and comparison means responsive to said plurality of cost functions for sequentially performing a plurality of comparisons to determine a minimum one of said cost functions, one of said cost functions being compared with a next sequentially determined one of said cost functions during each of said comparisons, the initial estimate of said set of invasion parameters associated with said minimum one of said cost functions being selected to represent said set of invasion parameters generated by said first means.

3. The system of claim 2, wherein a plurality of minimum ones of the cost functions is developed by said comparison means, the initial estimate of said set of invasion parameters associated with a selected one of the plurality of minimum ones of said cost functions being selected to represent said set of invasion parameters generated by said first means.

4. The system of claim 2, wherein said first means further comprises:

constraint determination means for determining a plurality of constraints corresponding, respectively, to said plurality of cost functions determined by said cost function determination means, said cost function determination means appending each of said plurality of constraints to a respective one of the plurality of cost functions thereby determining a plurality of new cost functions corresponding, respectively, to said plurality of initial estimates, said comparison means comparing each of said new cost functions with a next sequentially determined one of said new cost functions to determine a minimum one of said new cost functions, the initial estimate of said set of invasion parameters associated with said minimum one of said new cost functions being selected to represent said set of invasion parameters generated by said first means.

5. The system of claim 4, wherein a plurality of minimum ones of said new cost functions is developed by said comparison means, the initial estimate of said set of invasion parameters associated with a selected one of the plurality of minimum ones of said new cost functions being selected to represent said set of invasion parameters generated by said first means.

6. The system of claim 4, wherein said first means further comprises:

ratio determination means responsive to said plurality of constraints determined by said constraint determination means for determining a ratio of each of said plurality of constraints to a corresponding one of said plurality of cost functions thereby determining a respective plurality of quotients, said constraint determination means adjusting one or more of said plurality of constraints thereby producing a new one or more of said plurality of constraints when the quotients associated with said one or more of said plurality of constraints are not approximately equal to a predetermined value.

7. The system of claim 6, wherein a plurality of minimum ones of said new cost functions is developed by said comparison means, the initial estimate of said set of invasion parameters associated with a selected one of the plurality of minimum ones of said new cost functions is selected to represent said set of invasion parameters generated by said first means when the quotient associated with said selected one of the plurality of minimum ones of said new cost functions is approximately equal to said predetermined value.

8. A method of generating an output record medium in response to output signals developed by a well tool when said well tool is disposed in a borehole, comprising the steps of:

(a) determining a plurality of sets of invasion parameters corresponding to different respective depths in said borehole, each of said sets of invasion parameters being representative of a characteristic of a formation at the respective depth in said borehole and including a first parameter associated with a flushed zone in said formation, second parameters associated with a transition zone in said formation, and a third parameter associated with an uninvaded zone in said formation, said second parameters including a first value indicative of a midpoint of said transition zone between said flushed zone and said uninvaded zone and a second value related to a slope of a radial profile in said transition zone between said flushed zone and said uninvaded zone;

(b) determining the radial profile at each of said different respective depths in said borehole, said first parameter determining a first part of said profile, said second parameters determining a second part of said profile, and said third parameter determining a third part of said profile; and (c) using said radial profile at said each of said different respective depths, plotting a log, said log representing said output record medium.

9. The method of claim 8, wherein, for each of the different respective depths in said borehole, the determining step (a) comprises the steps of:

(d) determining a plurality of initial estimates of said invasion parameters;

(e) determining a plurality of cost functions corresponding, respectively, to said plurality of initial estimates, each of the cost functions being a function of one of said plurality of initial estimates of said invasion parameters;

(f) comparing each of said plurality of cost functions with a next sequentially determined one of said cost functions to determine a minimum one of said cost functions; and (g) at each of the different respective depths in said borehole, selecting said initial estimate of said invasion parameters associated with said minimum one of said cost functions to represent said invasion parameters at said each of the different respective depths.

10. The method of claim 9, wherein the determining step (e) further comprises the steps of:

(h) determining a plurality of constraints corresponding, respectively, to said plurality of cost functions, each of the constraints being a function of one of said plurality of initial estimates of said invasion parameters; and (i) appending each of said plurality of constraints to a corresponding one of said plurality of cost functions thereby determining a corresponding plurality of new cost functions.

11. The method of claim 10, wherein the comparing step (f) comprises the step of:

comparing each of said plurality of new cost functions with a next sequentially determined one of said new cost functions to determine a minimum one of said new cost functions, the initial estimate associated with said minimum one of said plurality of new cost functions representing said invasion parameters at said respective depth in said borehole.

12. The method of claim 11, further comprising the step of:

(j) determining a plurality of ratios of said plurality of constraints to the corresponding plurality of cost functions thereby determining a corresponding plurality of quotients, the initial estimate of said invasion parameters associated with a minimum one of said plurality of new cost functions representing said invasion parameters at each of said different respective depths in said borehole but only when said quotient associated with said minimum one of said plurality of new cost functions is approximately equal to a predetermined value.

13. A method of determining a radial profile of a formation traversed by a wellbore at a particular depth in said wellbore and recording said radial profile on an output record medium, said profile representing a characteristic of said formation, comprising the steps of:

(a) determining a set of invasion parameters corresponding to said particular depth in said wellbore, said set of invasion parameters representing said said characteristic of said formation at said particular depth in said wellbore and including a first parameter associated with a flushed zone in said formation, second parameters associated with a transition zone in said formation, and a third parameter associated with an uninvaded zone in said formation, said second parameters including a first value indicative of a midpoint of said transition zone between said flushed zone and said uninvaded zone and a second value related to a slope of said radial profile in said transition zone between said flushed zone and said uninvaded zone; and (b) determining the radial profile at said particular depth in said wellbore, said first parameter determining a first part of said profile, said second parameters determining a second part of said profile, and said third parameter determining a third part of said profile; and (c) recording said radial profile on said output record medium.

14. The method of claim 13, wherein, for said particular depth in said wellbore, the determining step (a) comprises the steps of:

(d) determining a plurality of initial estimates of said invasion parameters;

(e) determining a plurality of cost functions corresponding, respectively, to said plurality of initial estimates, each of the cost functions being a function of one of said plurality of initial estimates of said invasion parameters;

(f) comparing each of said plurality of cost functions with a next sequentially determined one of said cost functions to determine a minimum one of said cost functions; and (g) selecting said initial estimate of said invasion parameters associated with said minimum one of said cost functions to represent said invasion parameters of said radial profile at said particular depth.

15. The method of claim 14, wherein the determining step (e) further comprises the steps of:

(h) determining a plurality of constraints corresponding, respectively, to said plurality of cost functions, and (i) appending each of said plurality of constraints to a corresponding one of said plurality of cost functions thereby determining a corresponding plurality of new cost functions.

16. The method of claim 15, wherein the comparing step (f) comprises the step of:

comparing each of said plurality of new cost functions with a next sequentially determined one of said new cost functions to determine a minimum one of said new cost functions, the initial estimate of said invasion parameters associated with said minimum one of said plurality of new cost functions representing said invasion parameters of the radial profile at said particular depth in said wellbore.

17. The method of claim 16, further comprising the step of:

(j) determining a plurality of ratios of said plurality of constraints to the corresponding plurality of cost functions thereby determining a corresponding plurality of quotients, the initial estimate of said invasion parameters associated with a minimum one of said plurality of new cost functions representing said invasion parameters of the radial profile at said particular depth in said wellbore but only when said quotient associated with said minimum one of said plurality of new cost functions is approximately equal to a predetermined value.

18. A system responsive to output signals from a wellbore tool for determining a radial profile of a formation traversed by a wellbore at a particular depth in said wellbore and recording said radial profile on an output record medium, comprising first means responsive to said output signals from said wellbore tool for generating a set of invasion parameters, said invasion parameters including a first parameter associated with a flushed zone in a formation traversed by said wellbore, second parameters associated with a transition zone in said formation, and a third parameter associated with an uninvaded zone in said formation, said second parameters including a first value indicative of a midpoint of said transition zone between said flushed zone and said uninvaded zone and a second value related to a slope of said radial profile in said transition zone between said flushed zone and said uninvaded zone;

second means responsive to said set of invasion parameters generated by said first means for determining said radial profile of said formation at said particular depth in said wellbore; and third means for recording said radial profile determined by said second means on said output record medium.

19. The system of claim 18, wherein said first means comprises:

selection means for selecting a plurality of initial estimates of said set of invasion parameters, said plurality of initial estimates including a first initial estimate and subsequent initial estimates of said set of invasion parameters;

cost function determination means responsive to said plurality of initial estimates of said invasion parameters selected by said selection means for determining a plurality of cost functions corresponding, respectively, to said plurality of initial estimates; and comparison means responsive to said plurality of cost functions for sequentially performing a plurality of comparisons wherein, during each of said comparisons, one of said cost functions is compared with a next sequentially determined one of said cost functions to determine a minimum one of said cost functions, the initial estimate of said set of invasion parameters associated with said minimum one of said cost functions being selected to represent said set of invasion parameters generated by said first means.

20. The system of claim 19, wherein a plurality of minimum ones of the cost functions is developed by said comparison means, the initial estimate of said set of invasion parameters associated with a selected one of the plurality of minimum ones of said cost functions being selected to represent said set of invasion parameters generated by said first means.

21. The system of claim 19, wherein said first means further comprises:

constraint determination means for determining a plurality of constraints corresponding, respectively, to said plurality of cost functions determined by said cost function determination means, said cost function determination means appending each of said plurality of constraints to a respective one of the plurality of cost functions thereby determining a plurality of new cost functions corresponding, respectively, to said plurality of initial estimates, said comparison means comparing each of said new cost functions with a next sequentially determined one of said new cost functions to determine a minimum one of said new cost functions, the initial estimate of said set of invasion parameters associated with said minimum one of said new cost functions being selected to represent said set of invasion parameters generated by said first means.

22. The system of claim 21, wherein a plurality of minimum ones of said new cost functions is developed by said comparison means, the initial estimate of said set of invasion parameters associated with a selected one of the plurality of minimum ones of said new cost functions being selected to represent said set of invasion parameters generated by said first means.

23. The system of claim 21, wherein said first means further comprises:

ratio determination means responsive to said plurality of constraints determined by said constraint determination means for determining a ratio of each of said plurality of constraints to a corresponding respective one of said plurality of cost functions thereby determining a respective plurality of quotients, said constraint determination means adjusting one or more of said plurality of constraints thereby producing a new one or more of said plurality of constraints when the quotients associated with said one or more of said plurality of constraints are not approximately equal to a predetermined value.

24. The system of claim 23, wherein a plurality of minimum ones of said new cost functions is developed by said comparison means, the initial estimate of said set of invasion parameters associated with a selected one of the plurality of minimum ones of said new cost functions is selected to represent said set of invasion parameters generated by said first means when the quotient associated with said selected one of the plurality of minimum ones of said new cost functions is approximately equal to said predetermined value.

* * * * *